United States Patent
Hansen et al.

(10) Patent No.: US 10,293,421 B2
(45) Date of Patent: May 21, 2019

(54) CIRCULAR SAW DUST COLLECTION SHROUD

(71) Applicant: Dustless Depot, LLC, Price, UT (US)

(72) Inventors: Kendall Hansen, Price, UT (US); Kyle Alan Bjork, Buffalo, MN (US)

(73) Assignee: DUSTLESS DEPOT, LLC, Price, UT (US)

( * ) Notice: Subject to any disclaimer, the term of this patent is extended or adjusted under 35 U.S.C. 154(b) by 0 days.

(21) Appl. No.: 15/266,478

(22) Filed: Sep. 15, 2016

(65) Prior Publication Data

US 2018/0071845 A1  Mar. 15, 2018

(51) Int. Cl.
*B27B 9/02* (2006.01)
*B23D 59/00* (2006.01)

(52) U.S. Cl.
CPC ............. *B23D 59/006* (2013.01); *B27B 9/02* (2013.01)

(58) Field of Classification Search
CPC .. B23D 59/006; B27G 19/04; B23Q 11/0046; B23Q 11/0071; B28D 1/04; B27B 9/02
USPC .................. 30/375–379, 516, 124, 394, 122; 125/13.01, 14; 451/456, 359
See application file for complete search history.

(56) References Cited

U.S. PATENT DOCUMENTS

| | | |
|---|---|---|
| 437,004 A | 9/1890 | Shipley |
| 907,734 A | 12/1908 | Butterfield |
| 1,123,562 A | 1/1915 | Lund |
| 1,197,967 A | 9/1916 | Swenson |
| 1,302,263 A | 4/1919 | Woodworth |
| RE15,262 E | 1/1922 | Gurgel |
| 1,432,660 A | 10/1922 | Borque |
| 1,643,882 A | 9/1927 | Faiver |
| 1,779,031 A * | 10/1930 | Casey ............ B27B 9/00 30/374 |
| 1,850,504 A | 3/1932 | Janes |
| 2,032,382 A | 3/1936 | Torrison |
| 2,041,689 A | 5/1936 | Baumeister |
| 2,212,361 A | 8/1940 | Arthur |
| 2,279,186 A | 4/1942 | Terry et al. |
| 2,291,269 A | 7/1942 | Wiggleworth |
| 2,294,272 A | 8/1942 | Boice |
| 2,312,443 A | 3/1943 | Reiter |

(Continued)

FOREIGN PATENT DOCUMENTS

| | | | |
|---|---|---|---|
| DE | 3811197 A1 * | 10/1989 | ........... B23D 59/006 |
| EP | 556713 | 8/1993 | |

(Continued)

OTHER PUBLICATIONS

Bosch TG502 Tuck pointing grinder guard, accessed 2018, from Amazon.ca.

*Primary Examiner* — Laura M Lee
(74) *Attorney, Agent, or Firm* — Pate Peterson PLLC; Brett Peterson

(57) ABSTRACT

A shroud for circular saws is provided. The shroud attaches to the shoe of a circular saw and includes a blade opening to allow the saw blade to pass through the shroud. Dust is collected from the front and back of the blade and directed to a vacuum through an internal plenum. The shroud may include vertical hoods which extend up from the front and back of the blade opening and cooperate with the circular saw blade guard to capture dust and debris. The bottom of the shroud may include wheels to assist in using the shroud and saw.

20 Claims, 21 Drawing Sheets

(56) References Cited

U.S. PATENT DOCUMENTS

| | | |
|---|---|---|
| 2,384,688 A | 9/1945 | Morris |
| 2,440,684 A | 5/1948 | Huelster |
| 2,440,685 A | 5/1948 | Huelster |
| 2,503,854 A | 4/1950 | Trainor |
| 2,520,725 A | 8/1950 | Judd |
| 2,676,624 A * | 4/1954 | Gecmen ............... B23Q 9/0028 144/136.95 |
| 2,803,098 A | 8/1957 | Robert et al. |
| 2,817,134 A | 12/1957 | Fenton |
| 2,819,570 A | 1/1958 | Guilbert et al. |
| 2,819,571 A | 1/1958 | Morgan |
| 2,994,995 A | 8/1961 | Griffith |
| 3,166,877 A | 1/1965 | Reames |
| 3,256,648 A | 6/1966 | Subonovich |
| 3,468,076 A | 9/1969 | Jones |
| 3,511,322 A | 5/1970 | Holman |
| 3,667,170 A | 6/1972 | MacKay |
| 3,673,744 A | 7/1972 | Oimoen |
| 3,826,045 A | 7/1974 | Champayne |
| 3,835,543 A | 9/1974 | Polydoris et al. |
| 3,848,686 A | 11/1974 | Jysky et al. |
| 3,862,521 A | 1/1975 | Isaksson |
| 3,882,598 A | 5/1975 | Earle et al. |
| 3,882,644 A | 5/1975 | Cusumano |
| 3,945,281 A | 3/1976 | Kreitz |
| 3,987,589 A | 10/1976 | Marton |
| 4,011,792 A | 3/1977 | Davis |
| 4,016,649 A * | 4/1977 | Kloster ................ B23Q 9/0028 30/373 |
| 4,033,035 A * | 7/1977 | Trimmer .............. B23D 59/007 30/122 |
| 4,063,478 A | 12/1977 | Stuy |
| 4,090,297 A | 5/1978 | Wanner |
| 4,135,334 A | 1/1979 | Rudiger |
| 4,160,319 A * | 7/1979 | Caruso ................ B23D 59/007 30/122 |
| 4,201,256 A | 5/1980 | Truhan |
| 4,241,505 A * | 12/1980 | Bodycomb, Jr. .... B23D 59/006 144/252.1 |
| 4,253,362 A | 3/1981 | Olson |
| 4,296,572 A * | 10/1981 | Quintana ........... B23Q 11/0046 451/356 |
| 4,300,426 A * | 11/1981 | Weaver ............... B23D 59/006 269/41 |
| 4,326,864 A | 4/1982 | Sittler |
| 4,367,665 A | 1/1983 | Terpstra et al. |
| 4,381,628 A | 5/1983 | Dicke |
| 4,400,995 A | 8/1983 | Palm |
| 4,456,303 A | 6/1984 | Due |
| 4,515,504 A | 5/1985 | Moore |
| 4,566,511 A * | 1/1986 | Robinson ........... B23D 57/0076 144/48.5 |
| 4,574,532 A | 3/1986 | Haberle et al. |
| 4,576,072 A | 3/1986 | Terpstra et al. |
| 4,622,782 A | 11/1986 | Roestenberg |
| 4,641,401 A | 2/1987 | Hasegawa |
| 4,646,480 A | 3/1987 | Williams |
| 4,697,389 A | 10/1987 | Romine |
| 4,761,877 A | 8/1988 | Rupp |
| 4,765,099 A | 8/1988 | Tanner |
| 4,782,632 A | 11/1988 | Matechuk |
| 4,868,949 A | 9/1989 | Loveless et al. |
| 4,891,915 A | 1/1990 | Yasuda |
| 4,921,308 A | 5/1990 | Yelton et al. |
| 4,921,375 A | 5/1990 | Famulari |
| 4,932,163 A | 6/1990 | Chilton et al. |
| 4,932,164 A | 6/1990 | Sullivan et al. |
| 5,033,552 A | 7/1991 | Hu |
| 5,034,041 A | 7/1991 | Austin |
| 5,069,695 A | 12/1991 | Austin |
| 5,074,044 A | 12/1991 | Duncan et al. |
| 5,084,972 A | 2/1992 | Waugh |
| 5,105,585 A | 4/1992 | Hampl et al. |
| 5,125,190 A | 6/1992 | Buser et al. |
| 5,131,192 A | 7/1992 | Cheng |
| 5,163,252 A | 11/1992 | Garner et al. |
| 5,167,215 A | 12/1992 | Harding, Jr. |
| 5,176,408 A | 1/1993 | Pedersen |
| 5,201,785 A | 4/1993 | Nagano |
| 5,237,781 A | 8/1993 | Demetrius |
| 5,259,087 A | 11/1993 | Loveless et al. |
| 5,305,729 A | 4/1994 | Chiuminatta et al. |
| 5,327,649 A | 7/1994 | Skinner |
| 5,339,571 A | 8/1994 | Timmons et al. |
| 5,381,780 A | 1/1995 | Yelton et al. |
| 5,411,433 A | 5/1995 | Keller |
| 5,435,066 A | 7/1995 | Bare |
| 5,440,809 A | 8/1995 | Padilla |
| 5,445,056 A | 8/1995 | Folci |
| 5,527,207 A | 6/1996 | Azar et al. |
| 5,545,082 A | 8/1996 | Courson et al. |
| 5,558,571 A | 9/1996 | Toyoshima et al. |
| 5,564,408 A | 10/1996 | Bassols |
| 5,566,457 A | 10/1996 | Batschari et al. |
| 5,575,035 A | 11/1996 | Reis et al. |
| D376,526 S | 12/1996 | Hepburn |
| 5,582,225 A | 12/1996 | Schank |
| 5,588,213 A | 12/1996 | Swanberg |
| 5,609,516 A | 3/1997 | Courson et al. |
| 5,653,561 A | 8/1997 | May |
| 5,662,440 A * | 9/1997 | Kikuchi ................... B23Q 1/28 144/136.95 |
| 5,675,895 A | 10/1997 | Mori et al. |
| 5,680,704 A * | 10/1997 | Okubo .................... B08B 15/04 30/124 |
| 5,688,082 A | 11/1997 | Richardson |
| 5,704,956 A | 1/1998 | Loveless et al. |
| 5,713,785 A | 2/1998 | Nishio |
| D392,531 S | 3/1998 | Richardson |
| 5,774,992 A * | 7/1998 | Lindenmuth ........ B23D 59/006 30/124 |
| 5,791,979 A | 8/1998 | Duncan et al. |
| 5,815,933 A * | 10/1998 | Staniszewski ....... B23Q 9/0042 30/374 |
| 5,816,733 A | 10/1998 | Ishikawa et al. |
| 5,819,619 A | 10/1998 | Miller et al. |
| 5,931,072 A | 8/1999 | Shibata |
| 5,954,863 A | 9/1999 | Loveless et al. |
| 6,019,433 A | 2/2000 | Allen |
| 6,027,399 A | 2/2000 | Stewart |
| 6,053,674 A | 4/2000 | Thompson |
| 6,108,912 A | 8/2000 | Radigan |
| 6,112,736 A * | 9/2000 | Bearden ............... B23Q 9/0028 125/13.01 |
| 6,138,317 A | 10/2000 | Holmes et al. |
| 6,167,626 B1 | 1/2001 | Doumani et al. |
| 6,183,527 B1 | 2/2001 | O'Banion et al. |
| 6,219,922 B1 | 4/2001 | Campbell et al. |
| 6,230,411 B1 * | 5/2001 | Wall ..................... B23D 49/165 30/375 |
| 6,273,081 B1 | 8/2001 | Gorgol et al. |
| 6,318,352 B1 | 11/2001 | Gnazzo et al. |
| 6,347,985 B1 | 2/2002 | Loveless |
| 6,349,712 B1 * | 2/2002 | Halstead ............... B28D 1/045 125/12 |
| D456,234 S | 4/2002 | Keller |
| D456,685 S | 5/2002 | Keller |
| D458,825 S | 6/2002 | Keller et al. |
| 6,412,179 B1 | 7/2002 | Ende |
| 6,470,778 B1 | 10/2002 | Kaye, Jr. et al. |
| 6,471,574 B1 | 10/2002 | Rupprecht et al. |
| 6,557,261 B1 | 5/2003 | Buser et al. |
| 6,568,088 B1 | 5/2003 | Ende |
| 6,648,742 B1 | 11/2003 | Segiel |
| 6,651,343 B2 | 11/2003 | Laren et al. |
| 6,678,960 B2 | 1/2004 | Williams |
| 6,679,145 B1 | 1/2004 | Lee |
| 6,699,114 B1 | 3/2004 | Booeshaghi et al. |
| 6,726,554 B1 | 4/2004 | Chen et al. |
| 6,748,660 B2 | 6/2004 | Buser et al. |
| 6,786,556 B2 | 9/2004 | Due |
| 6,796,208 B1 | 9/2004 | Jorgensen |
| 6,811,476 B2 | 11/2004 | Ohlendorf |

(56) References Cited

U.S. PATENT DOCUMENTS

| | | | |
|---|---|---|---|
| 6,823,907 B2 | 11/2004 | Cheng | |
| D499,946 S | 12/2004 | Stirm | |
| 6,827,640 B2 | 12/2004 | Bures et al. | |
| 6,860,799 B2 | 3/2005 | Loveless | |
| 6,878,050 B2 | 4/2005 | Wendt et al. | |
| 6,886,441 B2 | 5/2005 | Hamilton | |
| 6,887,146 B2 | 5/2005 | Staas | |
| 6,896,604 B1 | 5/2005 | Taylor | |
| 6,896,605 B2 | 5/2005 | Ohlendorf | |
| 6,902,594 B2 | 6/2005 | Cho | |
| 6,935,939 B1 | 8/2005 | Buser et al. | |
| 6,948,412 B2 | 9/2005 | Brazell et al. | |
| 6,960,124 B2 | 11/2005 | Lee | |
| D513,161 S | 12/2005 | Chilton | |
| 6,988,939 B2 | 1/2006 | Hoffmann et al. | |
| 6,997,653 B2 | 2/2006 | Styles | |
| 7,000,605 B2 | 2/2006 | Due | |
| 7,013,884 B2 | 3/2006 | Guth | |
| 7,014,547 B2 | 3/2006 | Kleider | |
| 7,044,039 B2 | 5/2006 | Powell | |
| 7,044,843 B1 | 5/2006 | Lin | |
| 7,047,647 B1 | 5/2006 | Muller | |
| 7,047,650 B2 | 5/2006 | Chen | |
| 7,069,831 B2 | 7/2006 | Chang | |
| 7,112,005 B2 | 9/2006 | Due | |
| 7,159,323 B2 * | 1/2007 | Petrenko | B23D 47/02 30/371 |
| 7,171,880 B2 | 2/2007 | Powell | |
| D537,691 S | 3/2007 | Lamprecht et al. | |
| D537,692 S | 3/2007 | Aglassinger | |
| 7,195,429 B2 | 3/2007 | Dods et al. | |
| 7,197,826 B2 | 4/2007 | Baxivanelis | |
| 7,198,559 B2 | 4/2007 | Walstrum et al. | |
| 7,204,178 B2 | 4/2007 | Bergmann | |
| 7,216,572 B2 | 5/2007 | Keenan | |
| 7,222,560 B2 | 5/2007 | Parks et al. | |
| 7,223,161 B2 | 5/2007 | Kodani et al. | |
| 7,249,914 B2 | 7/2007 | Due | |
| D553,933 S | 10/2007 | Esenwein | |
| 7,296,356 B2 * | 11/2007 | Ngan | B23D 49/167 30/376 |
| 7,300,337 B1 | 11/2007 | Sun et al. | |
| 7,322,429 B2 | 1/2008 | Kim | |
| 7,438,633 B2 | 10/2008 | Jespersen | |
| D593,389 S | 6/2009 | Clayton | |
| 7,578,063 B2 | 8/2009 | Martin | |
| 7,625,265 B2 | 12/2009 | Woods et al. | |
| 7,628,682 B2 | 12/2009 | Andrasic et al. | |
| 7,635,293 B2 | 12/2009 | Sun et al. | |
| 7,661,194 B1 * | 2/2010 | Ende | B27B 9/02 30/371 |
| 7,661,195 B1 | 2/2010 | Wood | |
| D614,678 S | 4/2010 | Jorgensen et al. | |
| 7,740,086 B2 | 6/2010 | Bleicher et al. | |
| 7,805,805 B2 | 10/2010 | Loveless | |
| 7,887,624 B2 | 2/2011 | Ekstrom et al. | |
| 7,892,075 B2 | 2/2011 | Esenwein | |
| 7,958,641 B1 * | 6/2011 | Ende | B27B 9/02 30/376 |
| 7,985,042 B1 | 7/2011 | Paxton | |
| 8,011,398 B2 | 9/2011 | Loveless | |
| 8,133,094 B2 | 3/2012 | Loveless | |
| 8,137,165 B2 | 3/2012 | Loveless | |
| 8,177,606 B2 | 5/2012 | Loveless | |
| 8,181,559 B1 | 5/2012 | Ende | |
| 8,209,872 B1 | 7/2012 | Ende | |
| 8,381,711 B2 | 2/2013 | Loveless | |
| D677,139 S | 3/2013 | Yamamoto | |
| D677,545 S | 3/2013 | Sell | |
| D677,547 S | 3/2013 | Rosenau | |
| D677,548 S | 3/2013 | Rosenau | |
| D678,028 S | 3/2013 | Rosenau | |
| D687,195 S | 7/2013 | Sell | |
| 8,523,637 B2 | 9/2013 | Loveless | |
| 8,561,512 B2 | 10/2013 | Loveless | |
| 8,662,964 B2 | 3/2014 | Hiller | |
| 8,702,478 B2 | 4/2014 | Loveless et al. | |
| 8,740,674 B2 | 6/2014 | Esenwein | |
| D717,844 S | 11/2014 | Cappuccio | |
| D719,806 S | 12/2014 | Wiedemann | |
| 9,027,542 B2 * | 5/2015 | Ronzello, Sr. | B28D 7/02 125/13.01 |
| 9,038,275 B2 | 5/2015 | Jensen et al. | |
| D736,582 S | 8/2015 | Dietsche | |
| 9,101,993 B2 | 8/2015 | Yokota et al. | |
| D741,557 S | 10/2015 | Young | |
| D742,081 S | 10/2015 | Young | |
| D742,710 S | 11/2015 | Wiedemann | |
| D743,230 S | 11/2015 | Wiedemann | |
| D774,865 S | 12/2016 | Chen | |
| D793,456 S | 8/2017 | Lindsay | |
| D800,804 S | 10/2017 | Cappuccio | |
| 9,776,296 B2 | 10/2017 | Brewster | |
| 9,937,638 B2 | 4/2018 | Numata | |
| 2001/0023168 A1 | 9/2001 | Wuensch | |
| 2003/0104767 A1 | 6/2003 | Chilton | |
| 2003/0127904 A1 | 7/2003 | Due | |
| 2003/0220060 A1 * | 11/2003 | Bures | B23D 59/006 451/456 |
| 2004/0206220 A1 | 10/2004 | Keenan | |
| 2005/0088866 A1 | 4/2005 | Levine | |
| 2005/0155233 A1 | 7/2005 | Chen | |
| 2006/0005681 A1 | 1/2006 | Lambert et al. | |
| 2006/0019585 A1 | 1/2006 | Zayat | |
| 2006/0086350 A1 | 4/2006 | Due | |
| 2006/0147266 A1 | 7/2006 | Due | |
| 2006/0266184 A1 | 11/2006 | Hetcher et al. | |
| 2007/0079589 A1 | 4/2007 | Ekstrom et al. | |
| 2007/0155296 A1 * | 7/2007 | Hofmann | B24B 55/052 451/451 |
| 2007/0178815 A1 | 8/2007 | Buser | |
| 2007/0193759 A1 | 8/2007 | Sweig et al. | |
| 2007/0226948 A1 | 10/2007 | Due | |
| 2007/0228805 A1 | 10/2007 | Due | |
| 2007/0251104 A1 | 11/2007 | Heinrichs | |
| 2008/0053282 A1 | 3/2008 | Chen | |
| 2008/0060631 A1 | 3/2008 | Dofher | |
| 2008/0099053 A1 | 5/2008 | Loveless | |
| 2008/0109986 A1 | 5/2008 | Loveless | |
| 2008/0163492 A1 | 7/2008 | Johansson | |
| 2008/0200103 A1 | 8/2008 | Esenwein | |
| 2008/0244910 A1 | 10/2008 | Patel | |
| 2008/0271323 A1 | 11/2008 | Perlmutter | |
| 2009/0181604 A1 | 7/2009 | Loveless | |
| 2009/0181605 A1 | 7/2009 | Loveless | |
| 2009/0181606 A1 | 7/2009 | Loveless | |
| 2009/0183377 A1 | 7/2009 | Loveless | |
| 2009/0183800 A1 | 7/2009 | Loveless | |
| 2009/0186559 A1 | 7/2009 | Loveless | |
| 2009/0241283 A1 | 10/2009 | Loveless | |
| 2009/0311953 A1 | 12/2009 | Maute et al. | |
| 2010/0170538 A1 | 7/2010 | Baker et al. | |
| 2010/0269353 A1 | 10/2010 | Martin | |
| 2010/0285729 A1 | 11/2010 | Loveless | |
| 2010/0313867 A1 | 12/2010 | Loveless | |
| 2011/0021121 A1 | 1/2011 | Loveless | |
| 2011/0192262 A1 | 8/2011 | Loveless | |
| 2012/0084986 A1 | 4/2012 | Klawitter | |
| 2012/0121354 A1 | 5/2012 | Dickey | |
| 2012/0186520 A1 | 7/2012 | Hill | |
| 2014/0215752 A1 | 8/2014 | Loveless | |
| 2016/0031054 A1 | 2/2016 | Chang | |
| 2016/0368166 A1 | 12/2016 | Numata et al. | |
| 2017/0225358 A1 * | 8/2017 | Carlsson | B28D 7/02 |
| 2018/0071845 A1 * | 3/2018 | Hansen | B23D 59/006 |

FOREIGN PATENT DOCUMENTS

| | | | |
|---|---|---|---|
| EP | 0 579 964 | 1/1994 | |
| GB | 2 260 721 | 4/1993 | |
| GB | 2 262 159 | 6/1993 | |
| JP | 02-122755 | * 2/1990 | B24B 27/08 |
| JP | H 06-278103 | 10/1994 | |
| JP | 10-000559 | 1/1998 | |

(56) References Cited

FOREIGN PATENT DOCUMENTS

| | | |
|---|---|---|
| JP | 10-15717 | 1/1998 |
| JP | 2001-96525 | 4/2001 |
| KR | 10-2002-0056086 | 7/2002 |
| WO | WO 99/44786 | 9/1999 |

* cited by examiner

CIRCULAR SAW DUST COLLECTION SHROUD

THE FIELD OF THE INVENTION

The present invention relates to dust collection. In particular, examples of the present invention relates to a system for a dust collection shroud for circular saws.

BACKGROUND

Dust collection has become increasingly important both for commercial use and construction as well as for consumer or hobbyist use of power tools. Without adequate dust collection while working, dust and debris is typically scattered over a wide area. It is desirable to contain the dust and debris which is created while using power tools for several reasons. It is desirable to contain the dust and debris to keep the workplace cleaner and to minimize the time necessary to clean up afterwards. For example, circular saws are often used to cut wood, plastics, or masonry products. Cutting these materials creates fine dust which is spread over a large distance and which can be difficult and time consuming to clean up afterwards. It is also desirable to contain the dust and debris to keep the debris from getting into the tool itself, as the fine dust often causes premature failure of the tool bearings, motor, etc. Additionally, dust poses a health risk to the machine operator and others who may breathe it. It is thus desirable to collect the dust to minimize any exposure to the dust.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
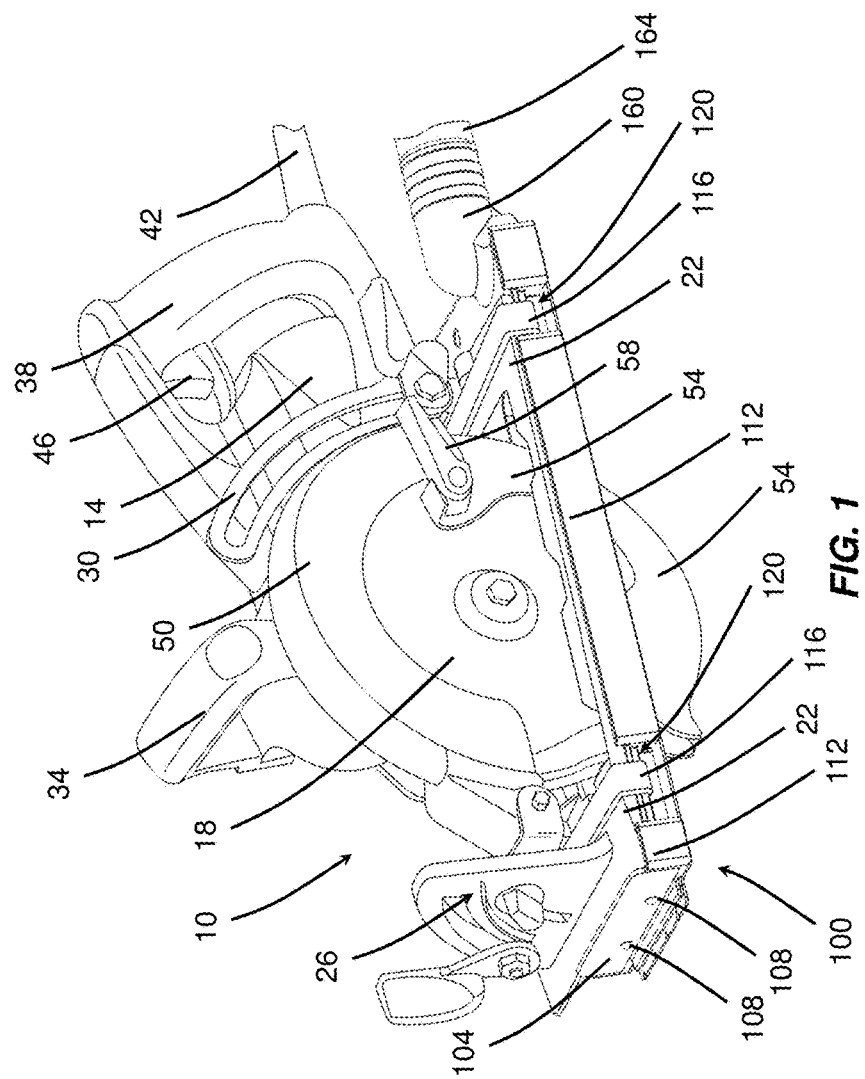
FIG. 1 is a drawing which shows a perspective view of a circular saw and shroud.

Corresponding reference characters indicate corresponding components throughout the several views of the drawings. Although the drawings have been drawn to scale, it will be appreciated that some elements in figures may be omitted or modified for clarity. Also, common but well-understood elements that are useful or necessary in a commercially feasible embodiment may not be depicted in order to facilitate a less obstructed view of more important structures in the illustrated embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure and claims. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples.

The disclosure describes a dust collection shroud for a circular saw. Particularly, the present disclosure describes a dust collection shroud for a circular saw which attaches to a circular saw shoe. Flexible clamps such as hook and loop strap clamps or band clamps are used to attach the shroud to the saw shoe. The shroud includes a blade slot formed through the shroud which receives the circular saw blade therethrough. The shroud includes dust passages formed within the shroud body so that dust is collected from the front and back of the circular saw blade, channeled through the shroud, and evacuated from the shroud by a vacuum port disposed adjacent the back of the shroud. The shroud includes front and rear rubber tongues which extend vertically from the shroud adjacent front and rear ends of a blade slot. The front and rear rubber tongues help capture and collect dust and debris formed while using the circular saw. The front rubber tongue extends upwardly inside of the stationary blade guard of the circular saw. The rear rubber tongue extends upwardly behind the rear of the circular saw's stationary blade guard. The rear rubber guard is useful in capturing larger debris such as when the saw is used to cut wood.

Turning now to FIG. 1, a perspective view of a circular saw 10 and a shroud 100 is shown. The circular saw 10 is of conventional design. An exemplary saw is the MAKITA 5377 mg, and known structures and features of this saw and other like saws are herein incorporated by reference. The circular saw 10 includes a motor 14 and associated transmission. The motor 14 and transmission are connected to a saw blade 18. The saw 10 includes a base plate 22, otherwise referred to as a saw shoe. The saw shoe 22 is the lower plate of the circular saw 10 and normally contacts and slides across the surface being cut by the saw to support the saw. The motor 14 is attached to the saw shoe 22 by a front pivot assembly 26 which allows the motor and blade assembly to pivot sideways to cut at an angle and which also cooperates with a rear depth adjustment mechanism 30 to adjust the cutting depth of the circular saw. The circular saw 10 includes a front handle 34 and a rear handle 38 which are used to control the saw. An electrical cord 42 and switch 46 provide power to the circular saw. The circular saw 10 includes an upper, stationary blade guard 50 which is attached to the motor and transmission and which extends over the top of the blade to prevent accidental contact with the blade. The stationary blade guard extends from a position adjacent the front of the blade and the saw shoe, over and around the top of the blade 18, and to a position adjacent the rear of the blade and adjacent the rear of the saw shoe. The circular saw 10 includes a lower, movable blade guard 54. The movable blade guard extends around the bottom of the circular saw blade in a closed position; extending from a position inside of the rear of the stationary blade guard 50, downward and forward around the bottom of the saw blade 18, and to a position adjacent the bottom of the saw shoe 22 near the front of the blade. The movable blade guard 54 rotates rearwardly as the saw cuts into material to expose the blade; rotating upwards and into the stationary blade guard 50. A handle 58 is attached to the movable blade guard 54 and may be used to manually move the movable blade guard 54 to expose the blade 18.

The circular saw 10 is attached to the dust collection shroud 100. A front stop 104 is attached to the dust collection shroud 100 with fasteners 108. The front stop 104 extends vertically above the top surface of the dust collection shroud 100 and forms a stop to position the circular saw 10 on the shroud 100 by placing the front of the saw shoe 22 against the front stop 104. The front stop 104 may be removed if a circular saw 10 has a longer than normal shoe 22. The dust collection shroud 10 also includes a side wall 112 which extends above the top surface of the shroud 100. The side wall 112 forms a stop to position the circular saw 10 on the shroud 100 by placing the side edge of the saw shoe 22 against the side wall 112. Many circular saws 10 have a shoe 22 which extends 1.5 inches beyond the blade, allowing for a single shroud 100 to be used. The circular saw shoe 22 is placed against the side wall 112 to locate the circular saw 10 relative to the shroud 100. Strap clamps 116, such as hook and loop fastener strap clamps, are used to secure the circular saw 10 to the shroud 100. The strap clamps 116 pass through slots 120 which extend laterally through the shroud 100 beneath the upper surface of the shroud 100. The strap clamps 116 are wrapped around the circular saw shoe and secured in order to secure the circular saw 10 to the shroud 100.

Figure 2:
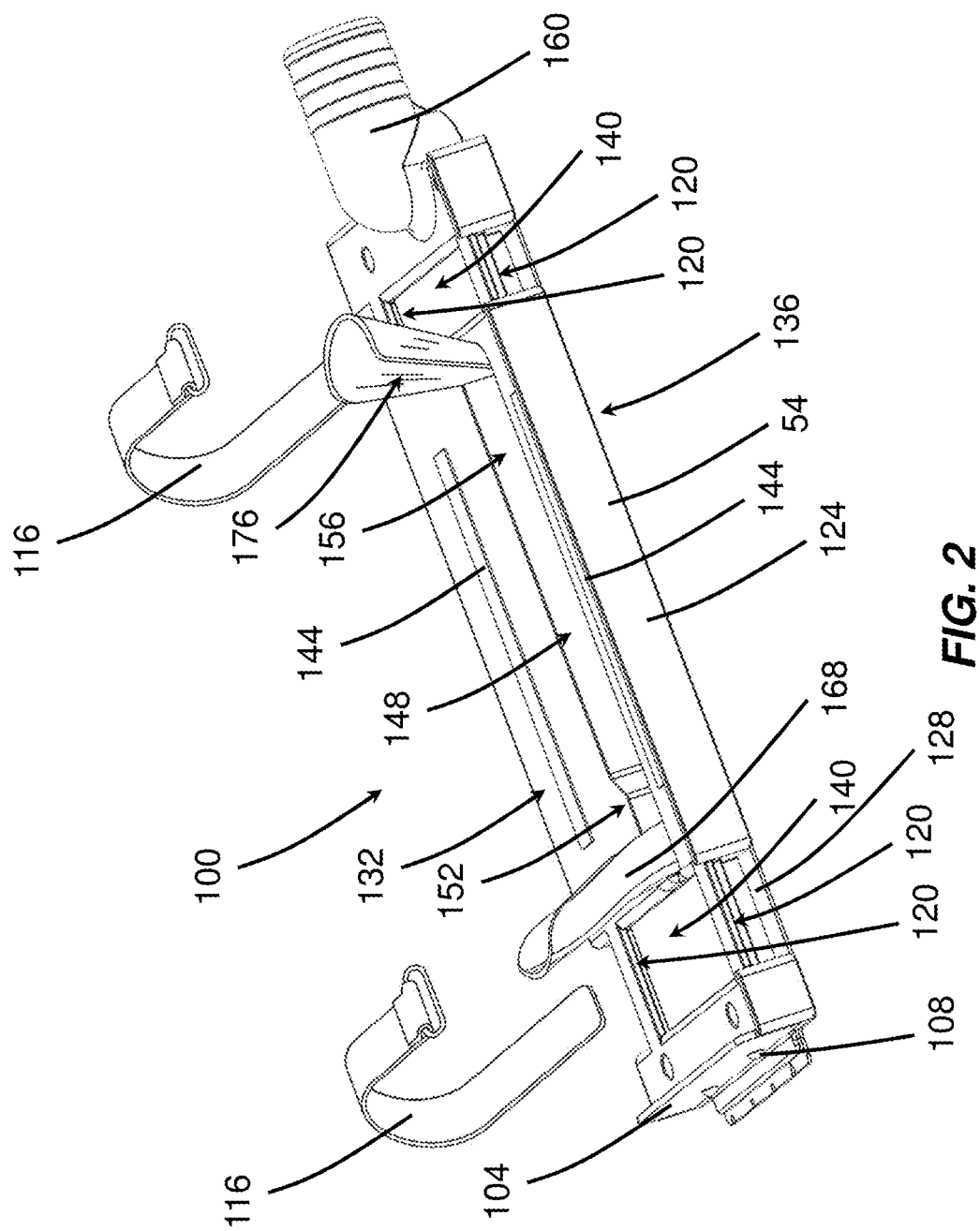
FIG. 2 is a drawing which shows a perspective view of the shroud.
Figure 3:
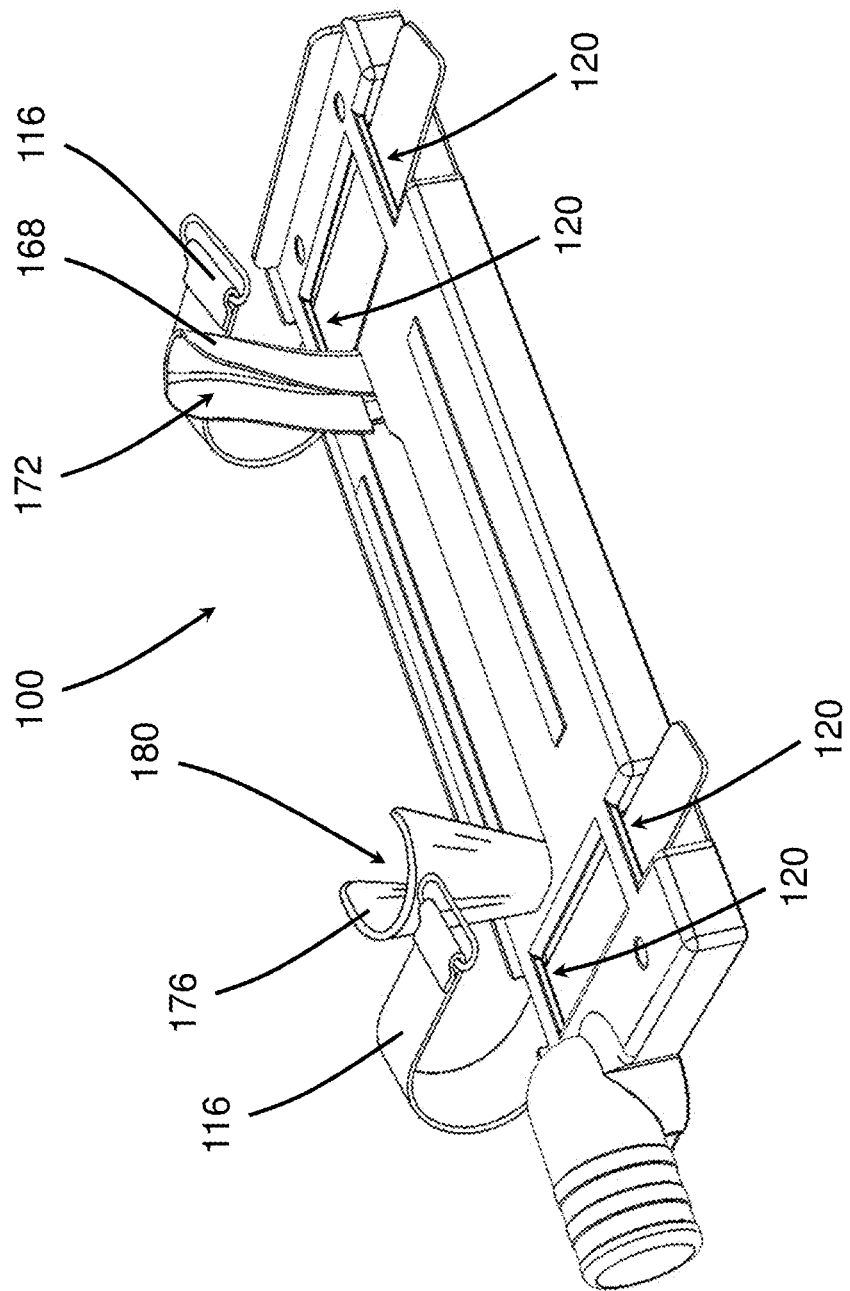
FIG. 3 is a drawing which shows a perspective view of the shroud.

The shroud 100 is discussed in greater detail in the following figures. Many of these figures present the shroud 100 without the circular saw 10 or without parts such as strap clamps 116 to better illustrate the structures and features of the shroud 100. FIGS. 2 and 3 show perspective views of the shroud 100. The shroud 100 is generally plate shaped and has an upper surface and lower surface which are parallel to each other. The shroud 100 includes an upper plate 124 and a lower plate 128 which are attached together and which define the upper surface and lower surface of the shroud, respectively. The upper plate 124 may be made from a molded plastic or composite material. The lower plate 128 may be made from a metal, such as aluminum, steel, or stainless steel, in order to provide a more durable surface as the lower plate 128 assumes the duties of the saw shoe 22 when the saw 10 is used with the shroud 100. That is to say that the lower plate 128 may contact the material being cut by the saw 10 and may slide across the material as the saw is used. In one embodiment, wheels are disposed adjacent the lower plate 128 and roll across the material being cut. The upper plate 124 defines an upper surface 132 which receives the saw shoe 22 to mount the saw 10 to the shroud 100. The upper surface 132 defines a generally flat area sized to receive the saw shoe 22. The lower plate 128 defines a lower surface 136 which contacts or is disposed adjacent the surface of the material being cut by the saw 10 while using the shroud 100.

The shroud 100 is thicker than the saw shoe 22 and includes air passages formed inside of the shroud between the upper surface and lower surface of the shroud. The upper plate 124 may include internal and external walls which define the air passages and the lower plate 128 may be generally flat and enclose the bottom of the air passages. In this manner, the shroud 100 may include an internal plenum formed by the upper plate 124 and lower plate 128.

A front stop 104 is attached to the front of the shroud 100 with fasteners 108. The front stop 104 may be mounted to the upper plate 124. The front stop 104 extends above the upper surface 132 and forms a stop against which the saw shoe 22 may be positioned when mounting the circular saw 10 to the shroud 100. The front stop 104 assists in properly positioning the saw 10 and also stabilizes the circular saw 10 against movement relative to the shroud 100 while using the saw. If necessary, the front stop 104 can be removed to allow circular saws with longer than normal shoes to fit the shroud.

A side wall 112, or a side stop, may be formed as a part of the upper plate 124 or may be attached to the side of the upper plate. The side wall 112 extends above the upper surface 132 and forms a stop against which the saw shoe 22 may be positioned when mounting the saw 10 to the shroud 100. The side wall assists in positioning the saw 10 and also stabilizes the saw 10 against movement relative to the shroud 100 while using the saw.

Strap clamps 116 are used to attach the circular saw 10 to the shroud 100. In one example, the strap clamps 116 are straps of hook and loop fastener material with a metal loop on an end thereof. The strap clamps 116 are passed through slots 120 formed in the shroud 100. The shroud 100 may include two slots 120 each defined by an upper bridge of material with a recess 140 located between the two slots 120; all formed in the top of the upper plate 124. This arrangement facilitates easy manufacturing of the upper plate 124 and secure attachment of the circular saw 10. The strap clamps 116 are passed through the slots 120 and around the saw shoe 22, and are then secured by passing the end of the clamp 116 through the end loop, folding the strap end back on itself, and securing the hook and loop material. One or more pieces of an elastomeric material 144, such as foam rubber, may be attached to the upper surface 132 of the upper plate 124. The elastomeric material 144 provides additional friction between the shroud 100 and the saw shoe 22 and also provides some compressibility while tightening the strap clamps 116. Both of these effects serve to improve the attachment of the saw 10 to the shroud 100 and make the saw more stable.

The shroud 100 includes a blade opening 148 which passes through both the upper plate 124 and the lower plate 128. The blade opening 148 is an elongate opening which is relatively long and relatively uniform in width. In use, the blade opening 148 receives both the blade 18 and the lower, movable blade guard 54. The blade opening 148 varies in width across its length. A front section 152 of the blade opening 148 is narrower in width than a rear section 156 of the blade opening. The front section 152 of the blade opening 148 may be shorter than the rear section 156, and may extend along about 10 to 20 percent or about 15 percent of the length of the blade opening with the wider rear section 156 extending between about 80 to 90 percent of the length of the blade opening, or about 85 percent of the blade opening. This blade opening 148 shape provides increased clearance around the lower, movable blade guard 54 while providing a narrower opening around the front of the blade 18 which improves the collection of dust from the front of the blade.

An exhaust port 160 is located at the back of the shroud 100. The exhaust port 160 is sized to receive a vacuum hose 164, such as a hose from a canister vacuum, and forms a conduit which draws air into openings adjacent the front and back of the blade slot 148, into the interior of the shroud 100 between the upper plate 124 and lower plate 128, along air flow passages in the shroud 100 to the rear of the shroud adjacent the exhaust port 160, through the open bore of the exhaust port, and into the vacuum hose and vacuum. For clarity in illustrating the shroud 100, the vacuum hose 164 is not shown in many figures.

The shroud 100 includes a front hood 168 which is attached to the shroud at the front of the blade opening 148. The front hood 168 is a tongue shaped extension which is made from a flexible material such as rubber. The front hood 168 may be molded with a "U" shaped cross section so that the front hood forms a vertical channel 172. Alternatively, the front hood 168 may be made from flat material and may bent into a "U" shaped channel 172 when the front hood 168 is placed into the saw guard 50. The front hood channel 172 faces rearwardly and the front hood 168 extends around the front of the blade slot 148 as well as the front most portions of the sides of the blade slot. The front hood 168 extends between about one half inch and about one inch rearwardly from the front of the blade slot 148. The front hood 168 extends approximately two inches upwardly above the upper surface 132 of the shroud 100. This vertical height of the front hood 168 is sufficient to allow the upper end of the front hood to be placed inside of the front of the stationary upper blade guard 50 of the saw 10. A front dust collection opening formed in the front of the blade slot 148 is generally located below the front hood 168 adjacent the lower surface 136 of the shroud 100.

In use, the front hood 168 closes the opening which would otherwise be formed between the shroud 100 and the front of the stationary upper blade guard 50. This increases the air flow and air flow velocity of outside air into the channel 172 and into the front dust collection opening. The front hood 168 prevents a large amount of dust from bypassing the shroud 100 and increases the collection efficiency of the front dust collection opening. A majority of the fine dust created while cutting with a circular saw 10 is collected in the front dust collection opening as it exits the material being cut.

The shroud 100 includes a rear hood 176 which is attached to the shroud 100 at the rear of the blade opening 148. The rear hood 176 is a tongue shaped extension which is made from a flexible material such as rubber. The rear hood 176 may be molded with a "U" shaped cross section so that the rear hood forms a vertical channel 180. Alternatively, the rear hood 176 may be made from flat material and may bent into a "U" shaped channel 180 when the rear hood 176 is installed onto the shroud 100. The rear hood channel 180 faces forwards relative to the shroud 100 and the rear hood 176 extends around the rear of the blade slot 148 as well as the rear most portions of the sides of the blade slot. The rear hood 176 extends between about one quarter inch and about one inch forwards from the rear of the blade slot 148. The rear hood 176 extends approximately two inches upwardly above the upper surface 132 of the shroud 100. This vertical height of the rear hood 176 is sufficient to allow the upper end of the rear hood to extend vertically adjacent the rear of the stationary upper blade guard 50 of the saw 10. The rear hood 176 need not be placed into the stationary blade guard 50, but extends vertically adjacent the lower rear outer surface of the stationary blade guard 50. A rear dust collection opening formed in the rear of the blade slot 148 is generally located below the rear hood 176 adjacent the lower surface 136 of the shroud 100.

In use, the rear hood 176 collects larger pieces of debris, such as is formed when cutting wood with a circular saw 10, and receives this debris as it exits the stationary upper blade guard 50 and funnels this debris towards the rear dust collection opening where it may be drawn into the shroud 100 and collected by a vacuum. Coarse cutting debris often bypasses the front dust collection opening and is carried with the blade around to the rear of the stationary upper blade guard 50. The rear hood 176 increases the collection efficiency of the shroud 100 in capturing larger cutting debris.

FIG. 3 illustrates how the strap clamps 116 pass through the slots 120 and are used to secure the circular saw 10 to the shroud 100.

Figure 4:
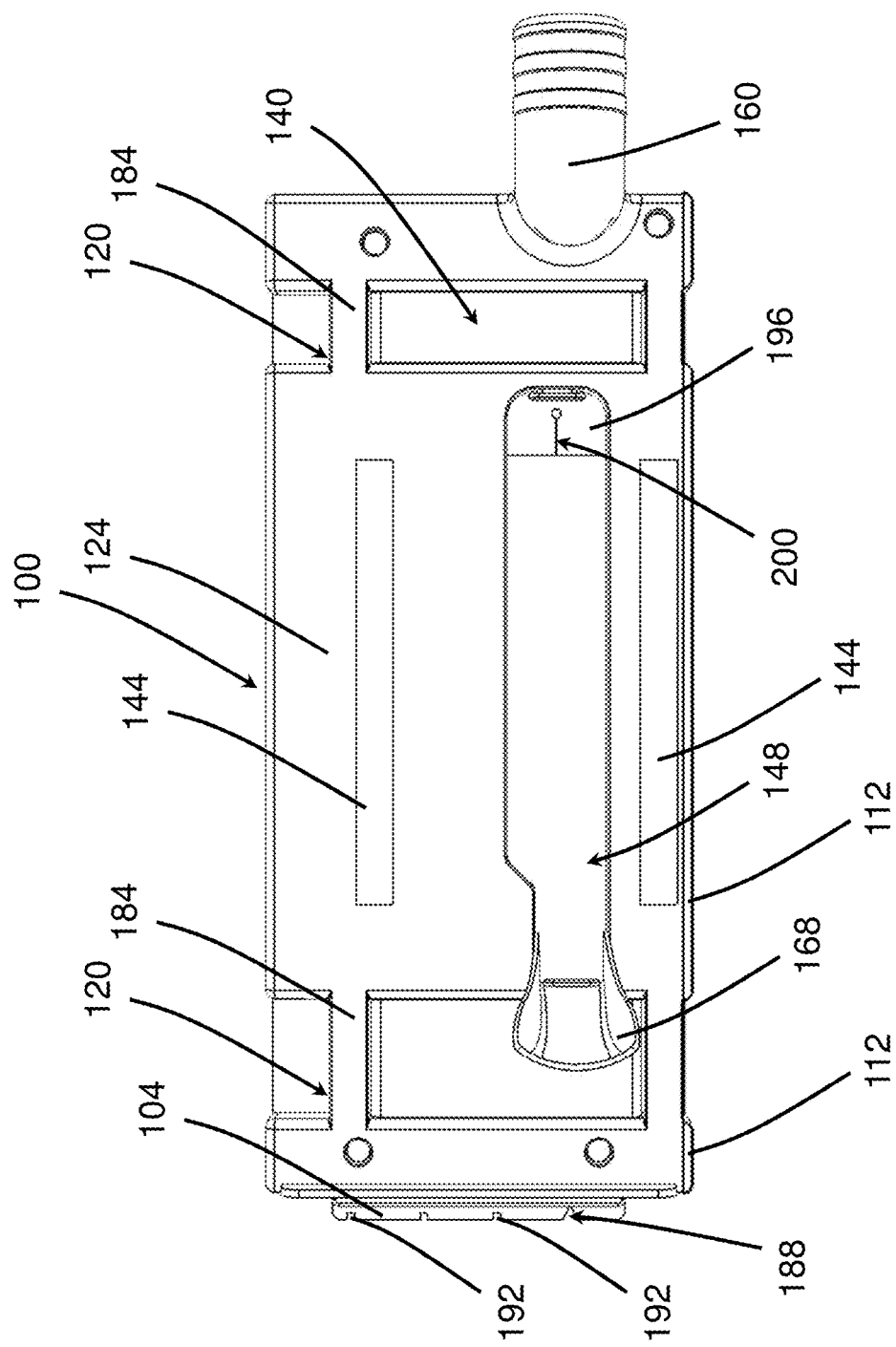
FIG. 4 is a drawing which shows a top view of the shroud.

FIG. 4 shows a top view of the shroud 100. For clarity, the strap clamps 116 and the rear hood 176 are not shown. It can be seen how the clamp slots 120 are formed by a bridge of material 184 that spans over a cavity; creating a sufficient space to allow the strap clamps 116 to pass therethrough. It can be seen how the lower plate 128 includes a cut indexing mark 188 which shows the position of the saw blade relative to the shroud 100 and allows a user to easily align the saw for cutting. The lower plate 128 may also include a number of additional cut indexing marks 192 spaced at one inch increments.

The shroud 100 includes a rubber wiper 196. The rubber wiper 196 is typically attached to the shroud 100 so that it is parallel to the lower plate 128 and so that it is adjacent to the lower plate. The rubber wiper 196 may be mounted to the bottom of the upper plate 124 so that it is near the lower surface 136 of the shroud 100 and mounted against the lower plate 128. The rubber wiper 196 is mounted at the back of the blade slot 148 and closes the bottom of the back of the blade slot 148. The rubber wiper 196 provides a few benefits to the shroud 100. The rubber wiper 196 may be formed with a cut 200 formed therethrough. The cut 200 is formed through the thickness of the rubber wiper 196 and extends rearwardly from the front edge of the rubber wiper 196. If desired, the cut 200 may terminate at its rearward end in a circular hole to stop further tearing of the cut. The cut 200 allows the movable lower blade guard 54 to pass through the rubber wiper 196 to move downwardly into a closed position. The rubber wiper 196 blocks off the rear most portion of the blade opening 148 when the lower blade guard 54 is raised for use of the saw 10. The blade slot 148 is long enough and wide enough and extends sufficiently to the rear of the shroud 100 to allow the movable lower blade guard 54 to pass through the blade slot 148. The rubber wiper 196 closes a rear portion of the blade slot 148 which is behind the blade 18 during use of the saw 10 and shroud 100. The saw blade 18 need not cut through the rubber wiper 196, but the rubber wiper may extend forwards to a position adjacent a rear edge of the saw blade 18.

Thus, as the circular saw 10 and shroud 100 are used, the lower wiper allows the movable lower blade guard 54 to pass through the blade slot 148 near the back of the blade slot by bending the forward portions of the rubber wiper 196 on either side of the cut 200. When the lower movable blade guard 54 is moved upwardly to cut with the saw 10, the rubber wiper 196 closes around the cut 200 and remains relatively flat; closing the rear portion of the blade slot 148. The rubber wiper 196 is positioned adjacent the rear of the blade 18 and closes the portion of the blade slot which is rearward of the blade 18. As the circular saw 10 is used for cutting, larger debris which is carried around the saw blade guide 50, 54 by the movement of the blade is thrown downwardly at the rear of the blade slot 148 and contacts the rubber wiper 196. The rubber wiper 196 stops these debris particles and allows the rear dust collection opening to collect most of these particles. The rubber wiper 196 thus allows for use of the movable lower blade guard 54 while closing off the portion of the blade slot 148 occupied by the movable lower blade guard 54 and adjacent the rear edge of the blade 18 while the movable lower blade guard is retracted for use of the saw 10.

Figure 5:
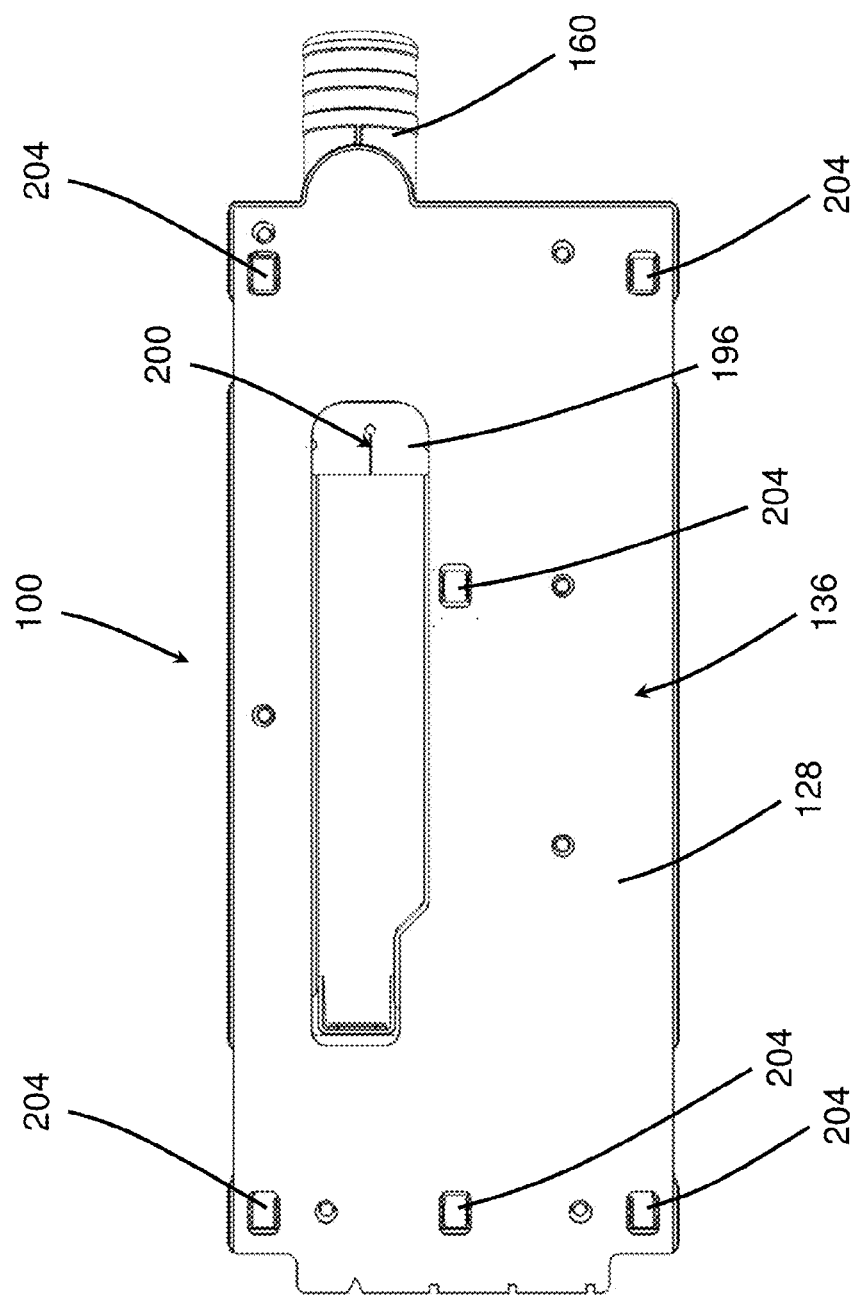
FIG. 5 is a drawing which shows a bottom view of the shroud.

FIG. 5 shows a bottom view of the shroud 100. The size and shape of the blade opening 148 can be seen. The blade opening is often between about one inch and about 1.25 inches wide at the rearward portion and is narrowed to about three fourths of an inch wide at its front portion. The blade opening 148 is often about 8 inches long. The positioning and shape of the rubber wiper 196 can also be seen.

FIG. 5 also shows the wheels 204 attached to the bottom of the shroud. The upper plate 124 may have axle mounts molded therein and the lower plate 128 may have wheel openings formed therein so that the wheels 204 and associated axles may be mounted to the upper plate 124 and the lower plate 128 attached to the upper plate 124 so that the wheels 204 extend below the lower surface 136 of the lower plate 128 and shroud 100. The shroud 100 includes six wheels 204. Two wheels 204 are attached to the left side of the shroud 100. The left side of the shroud 100 (and the left side of the circular saw shoe 22) is typically the side of the shroud which contacts the portion of a piece of material which is being cut from the larger piece of material. Four wheels 204 are attached to the right side of the shroud 100. The right side of the shroud 100 (and the right side of the circular saw shoe 22) is typically the side of the shroud 100 which contacts the portion of the piece of material being cut by the saw which is the larger piece of material. Of the wheels 204 on the right side of the shroud 100, two wheels 204 are near the right edge of the shroud 100 while two wheels 204 are near the center of the shroud 100; just right of the blade opening 148. The wheels 204 are positioned in the shroud such that the two center wheels 204 (the two wheels on the right side of the shroud 100 which are near the blade opening 148) are slightly higher than the wheels which are near the left and right edges of the shroud 100. The two wheels 204 near the center of the shroud 100 are between about 0.05 inches and about 0.001 inches higher than the four wheels 204 mounted near the left and right edges of the shroud 100. This allows the outer four wheels 204 only to contact a flat piece of material while cutting through the material instead of all six wheels 204 contacting the piece of material. This minimizes any binding as the wheels 204 roll across the material. If the material being cut does not extend to the wheels 204 on the left of the shroud, or if the piece of material left of the saw blade 18 is cut off, the left two wheels 204 will not contact the material and the center two wheels 204 will contact the material along with the right two wheels 204. This provides good support of the saw 10 and good rolling motion of the saw shroud 100. The wheels reduce friction in cutting, reduce wear on the lower plate 128, and assist in cutting straight on a piece of material.

Figure 6:
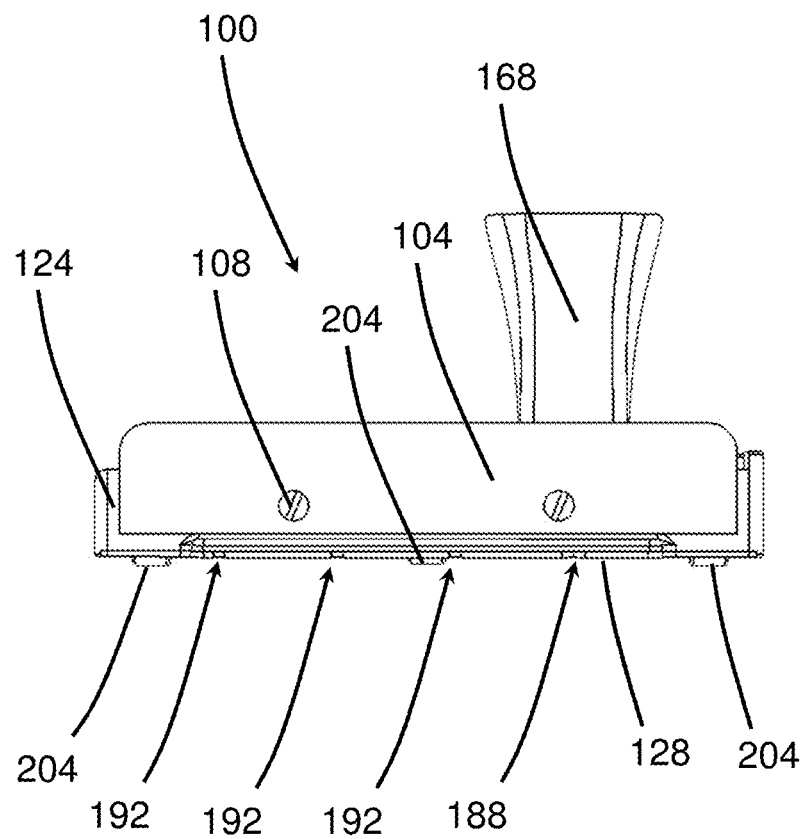
FIG. 6 is a drawing which shows a front view of the shroud.
Figure 7:
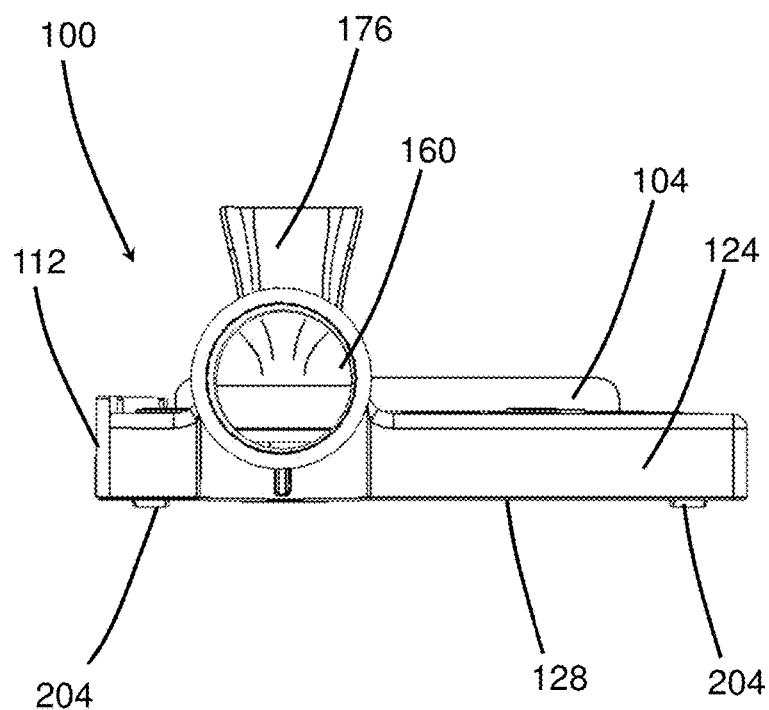
FIG. 7 is a drawing which shows a back view of the shroud.

FIGS. 6 and 7 show front and rear views of the shroud 100. FIG. 6 illustrates how the left most wheels 204 (on the right side of the front view of FIG. 6) and the right most wheels 204 (on the left side of FIG. 6) are mounted slightly lower than the center wheels 204. As discussed, the center wheels 204 are mounted between about 0.001 and 0.05 inches higher than the left and right wheels 204. FIG. 6 also illustrates the height and positioning of the front stop 104 and the front hood 168. The cut indexing mark 188 and the additional reference marks 192 spaced at increments can also be seen. The additional referencing marks 192 may be spaced apart from the cut indexing mark 188 and adjacent indexing marks 192 by common increments such as 1 inch, ½ inch, or 1 centimeter. The cut indexing mark 188 and additional cut indexing marks 192 may be formed into the front of the lower plate 128 and the front of the lower plate 128 may extend forwards from the front of the upper plate 124 to expose the marks.

FIG. 7 shows the rear of the shroud 100. Two rear wheels 204 can be seen, but the remaining wheels are not visible. The relative height and positioning of the rear hood 176 as well as the relative size of the exhaust port 160 are also seen. It is appreciated herein that the exhaust port 160 is referred to as an exhaust port as air flowing through the shroud exits through the exhaust port and into a vacuum hose. The forward section of the exhaust port 160 transitions from the round exhaust port opening into the main body of the shroud 100. The shroud 100 is typically shorter in height than the vacuum hose 164 and exhaust port 160 in order to maximize use of the circular saw 10. It is appreciated that the height of the shroud 100 reduces the cutting depth of the blade 18. Accordingly, the shroud 100, between the upper surface 132 and lower surface 136, is often about 0.75 inches thick. The interior passage of the exhaust port 160 is typically about 1.25 inches in diameter to fit available vacuum hoses. The distal exterior of the exhaust port 160 is typically round and is approximately 1.5 inches in diameter so that 1.5 inch inside diameter vacuum hoses may be attached to the exterior of the exhaust port. The front section of the exhaust port interior passage thus curves downwardly and transitions into the interior plenum space of the shroud 100.

Figure 8:
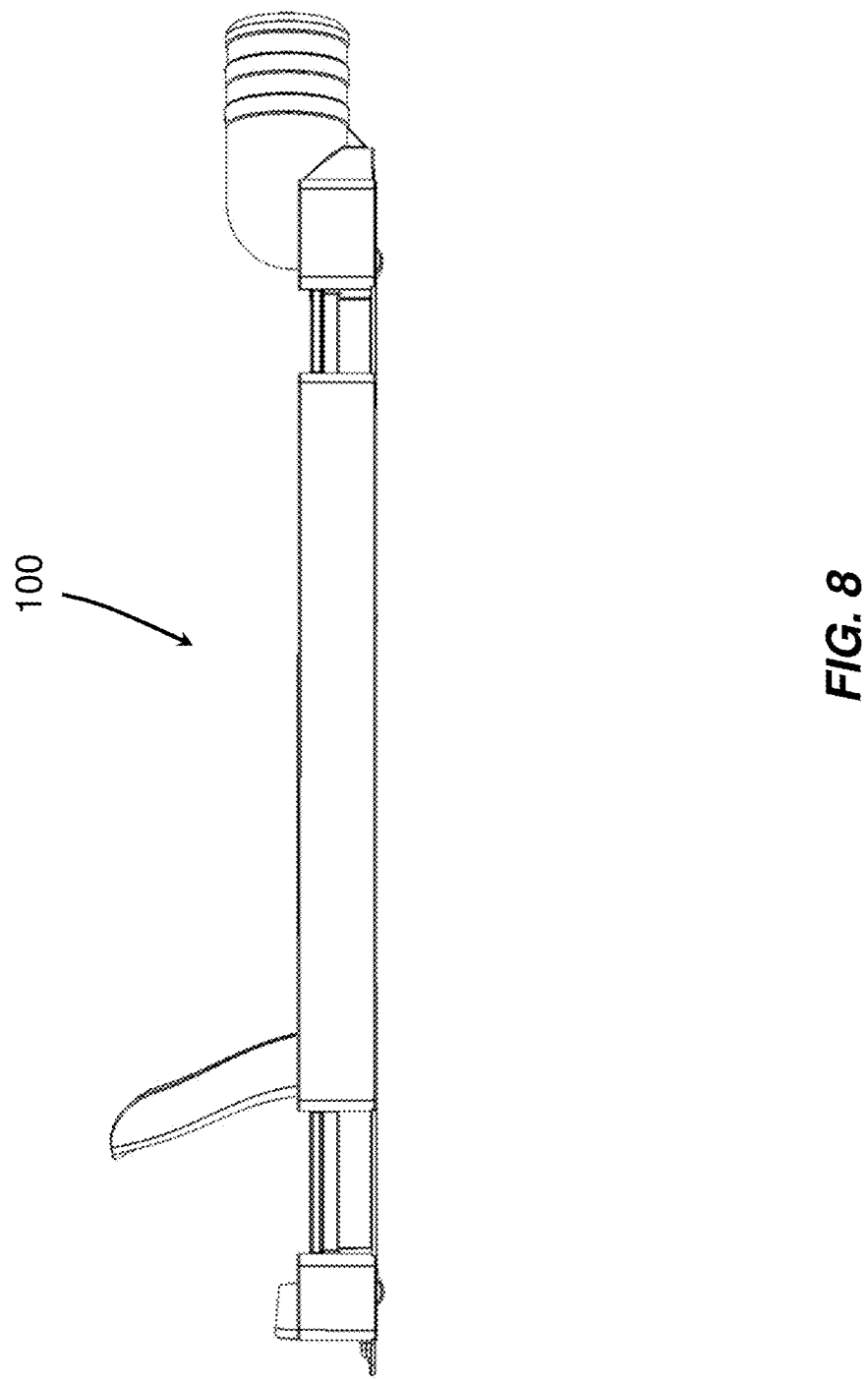
FIG. 8 is a drawing which shows a left side view of the shroud.
Figure 9:
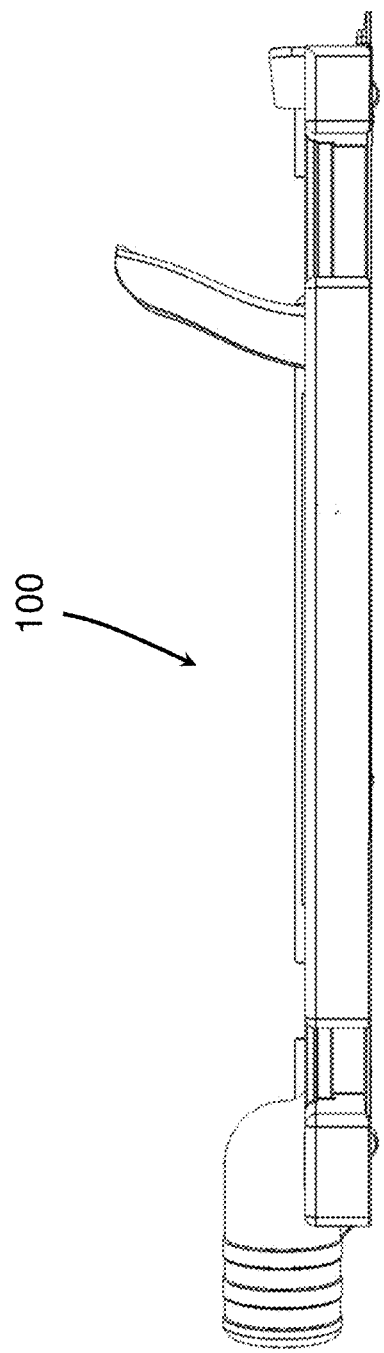
FIG. 9 is a drawing which shows a right side view of the shroud.

FIGS. 8 and 9 show left and right views of the shroud 100, respectively. The rear hood 176 has been removed from the shroud 100. As discussed, the rear hood 176 may be removed depending on the material being cut and the usage of the circular saw 10. For example, if the circular saw 10 and shroud 100 are being used to masonry with a diamond blade, the cutting debris is largely fine dust and is mostly captured by the front dust collection at the front of the blade opening 148. In this situation, the rear hood 176 may not be necessary and may be removed. If the circular saw 10 and shroud 100 are used with a coarse blade 18 with few teeth to cut wood, larger debris is produced which bypasses the front dust collection opening and is largely captured by the rear dust collection opening. In this situation, the rear hood 176 is desirable to capture most of the debris and is used. It will be appreciated that the shroud 100 may always be used with the rear hood 176.

Figure 10:
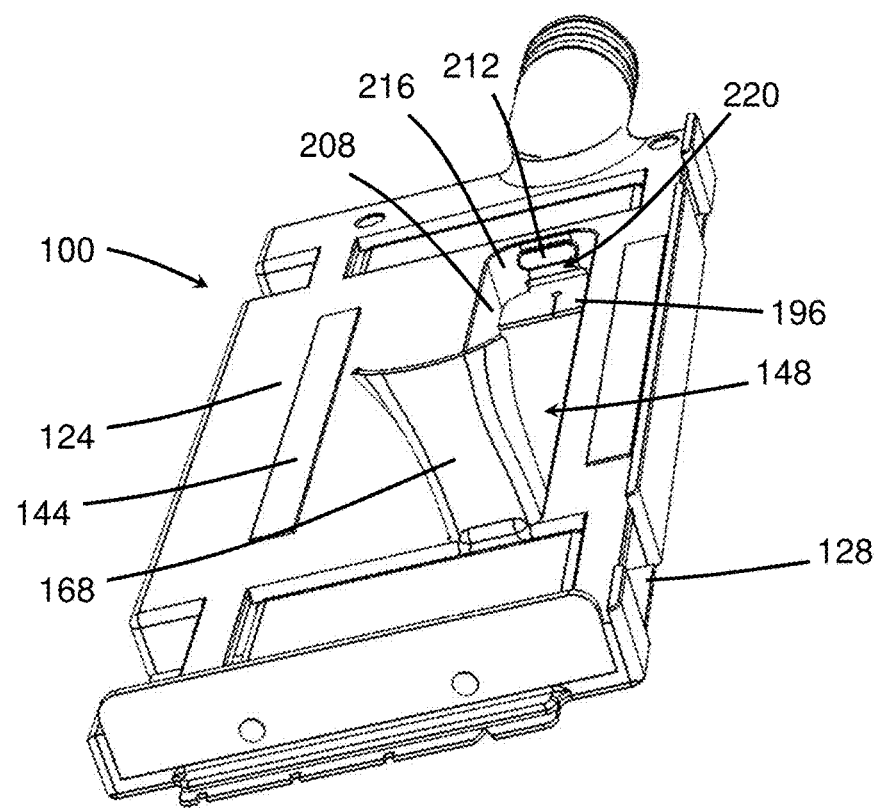
FIG. 10 is a drawing which shows a perspective view of the shroud.
Figure 11:
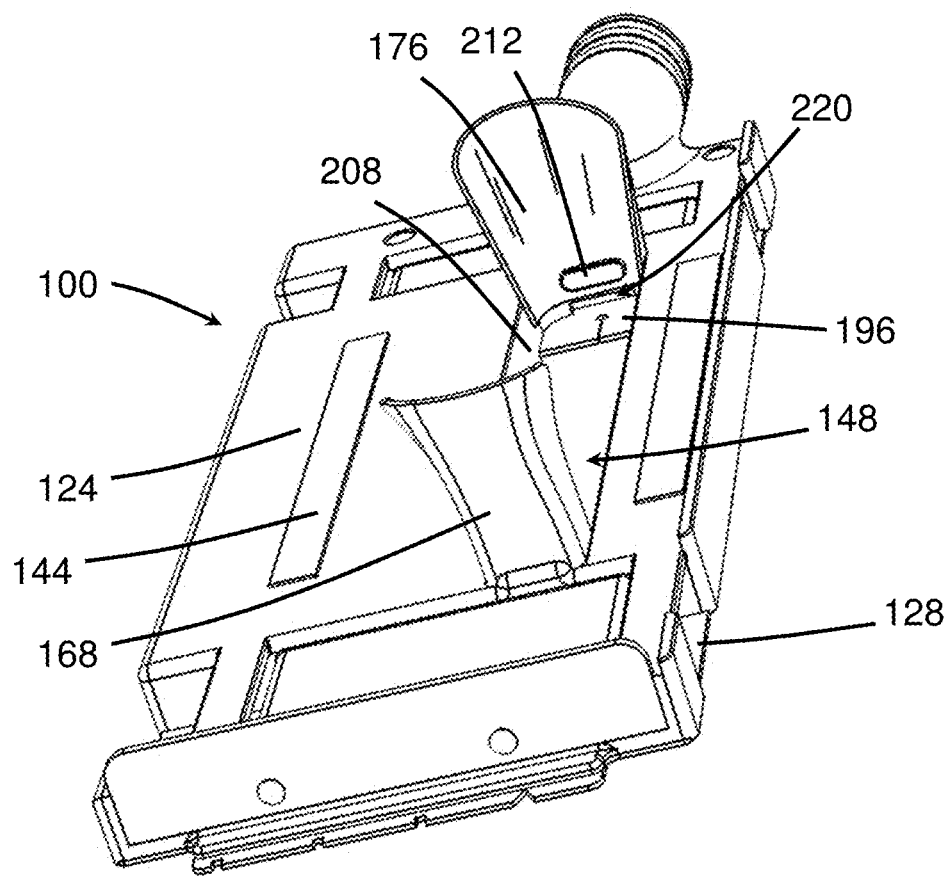
FIG. 11 is a drawing which shows a perspective view of the shroud.

FIGS. 10 and 11 show front perspective views of the shroud 100, respectively. FIGS. 10 and 11 show the right and rear section of the blade opening 148. It can be seen how the blade opening 148 has closed side walls, including closed right side wall 208, which extend between the front and rear sections of the blade opening. The rear of the blade opening 148 includes a mounting post 212 which is used to attach the rear hood 176 to the shroud 100. The mounting post 212 typically includes an enlarged head attached to a neck of reduced size; allowing an elastomeric member to be attached to the mounting post 212 by stretching the member over the head and onto the neck. This works well with a rear hood 176 made of sheet rubber or another elastomeric material. While the drawing shows a single mounting post 212 attached to the rear wall 126 of the blade opening 148, the shroud may include additional mounting posts attached to the rear of the side walls 208 adjacent the rear of the blade opening 148. The mounting post 212 is formed as part of the molded upper plate 124. The rear dust collection opening 220 is located at the rear of the blade opening 148 on the rear wall 216 of the blade opening. As shown, the rear dust collection opening 220 is located below the rear mounting post 212. If the rear hood 176 was attached to the rear mounting post (as shown in FIG. 11), the rear hood 176 terminates above the rear dust collection opening 220 and channels air and debris towards and into the dust collection opening 220. The rear dust collection opening 220 is often about 0.75 inches in width and about 0.25 inches in height, and may often be between about 0.5 inches and 1 inch in width and between about 0.2 inches and about 0.5 inches in height.

It can be seen how the rubber wiper 196 is mounted near the lower surface 136 of the shroud 100. The rubber wiper 196 may preferably be mounted between the bottom of the upper plate 124 and the top of the lower plate 128 and clamped into position by these two members. The rear dust collection opening 220 is located just above the rubber wiper 196 and, as shown, is open to the lower wiper 196. The perimeter of the rear dust collection opening 220 is formed on the sides and top by the lower plate 124 and on the bottom by the rubber wiper 196. Cutting debris is thus guided into the rear dust collection opening 220 by the rubber wiper 196 and the rear hood 176.

Figure 12:
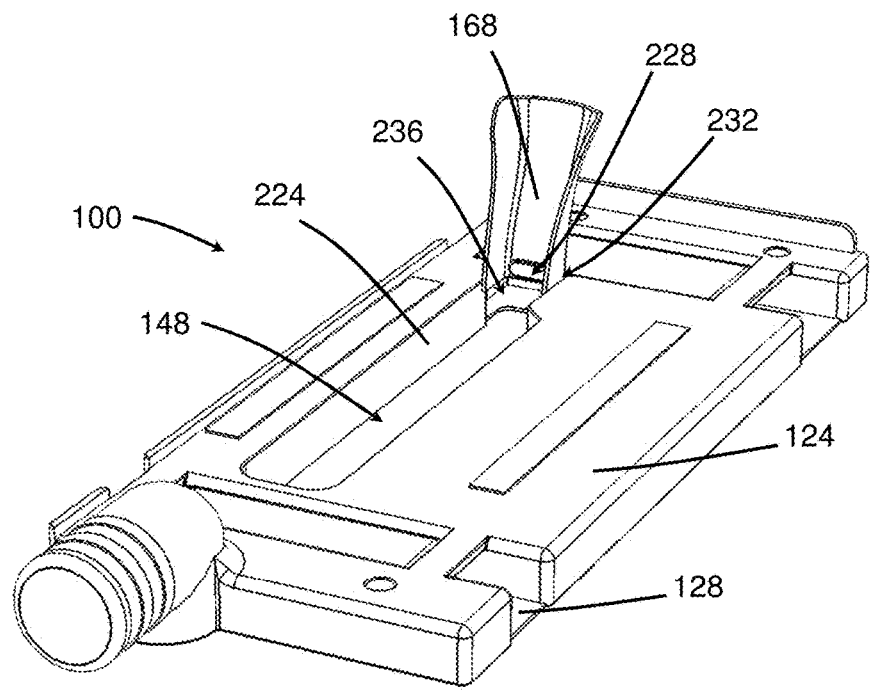
FIG. 12 is a drawing which shows a perspective view of the shroud.

FIG. 12 shows a rear perspective view of the shroud 100. The left and front sections of the blade opening 148 can be seen. It can be seen how the blade opening 148 includes a closed left side wall 224 which extends between the front and rear sections of the blade opening. The front of the blade opening 148 includes a front mounting post 228 which is used to attach the front hood 168 to the shroud 100. The mounting post 228 typically includes an enlarged head attached to a neck of reduced size; allowing an elastomeric member to be attached to the mounting post 228 by stretching the member over the head and onto the neck. This works well with a front hood 168 made of sheet rubber or another elastomeric material. While the drawing shows a single mounting post 228 attached to the front wall 232 of the blade opening 148, the shroud 100 may include additional mounting posts attached to the front of the side walls 208, 224 adjacent the front of the blade opening 148. The mounting post 228 is formed as part of the molded upper plate 124. The front dust collection opening 236 is located at the front of the blade opening 148 on the front wall 232 of the blade opening as well as on the front portions of the side walls 208, 224. The front dust collection opening 236 is located below the front mounting post 228 and the front hood 168 terminates above the front dust collection opening 236 and channels air and debris towards and into the front dust collection opening 236. The front dust collection opening is formed in the upper plate 124 and extends downwardly to the lower plate 128 so that the front dust collection opening is bounded by the lower plate 128 on the bottom and the upper plate 124 on the top and sides.

The front dust collection opening 236 is approximately 0.625 inches in height and extends across the width of the front wall 232 and also extends approximately 0.5 inches into the front sections of the right side wall 208 and left side wall 224, making the front dust collection opening 236 approximately 0.625 inches by approximately 1.5 inches in size. The front dust collection opening 236 is often between about 0.3 inches and 0.7 inches in height and between about 1 inch and 2 inches in total width (including the horizontal dimension of the opening 236 disposed on the right side wall 208, the front wall 232, and the left side wall 224. Accordingly, the front dust collection opening 236 is often between about 2 and 10 times as large as the rear dust collection opening 220 in area. The front dust collection opening 236 is often between about 4 and 10 times as large as the rear dust collection opening 220 in area, and may be about 6 to about 8 times as large as the rear dust collection opening 220 in area.

FIG. 12 also shows how the blade opening 148 is narrower near the front and wider in the rear to accommodate the movable lower blade guard 54 of a circular saw 10. As shown, the right wall 208 jogs laterally to form the widened rear section of the blade opening.

Figure 13:
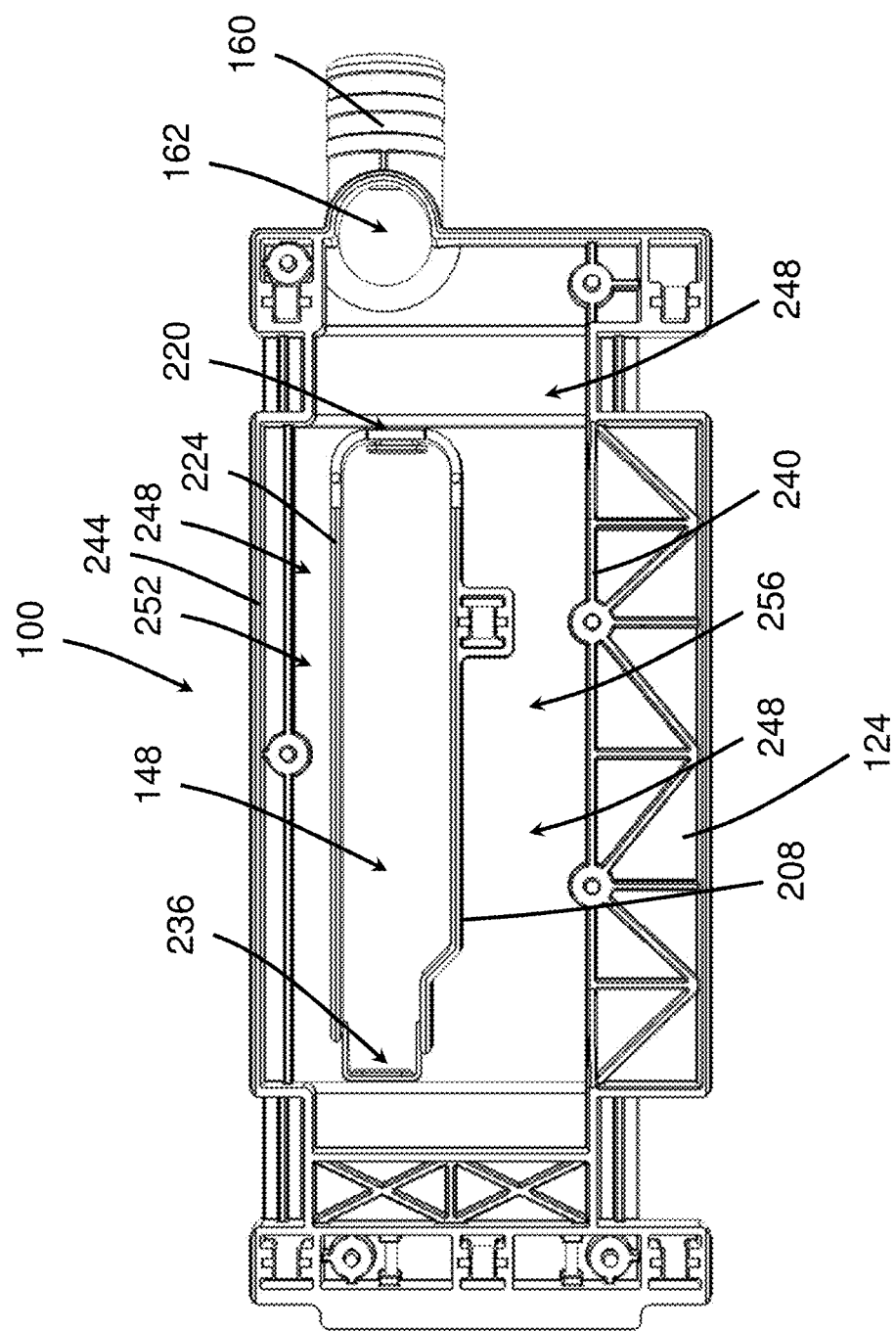
FIG. 13 is a drawing which shows a bottom view of the shroud.
Figure 14:
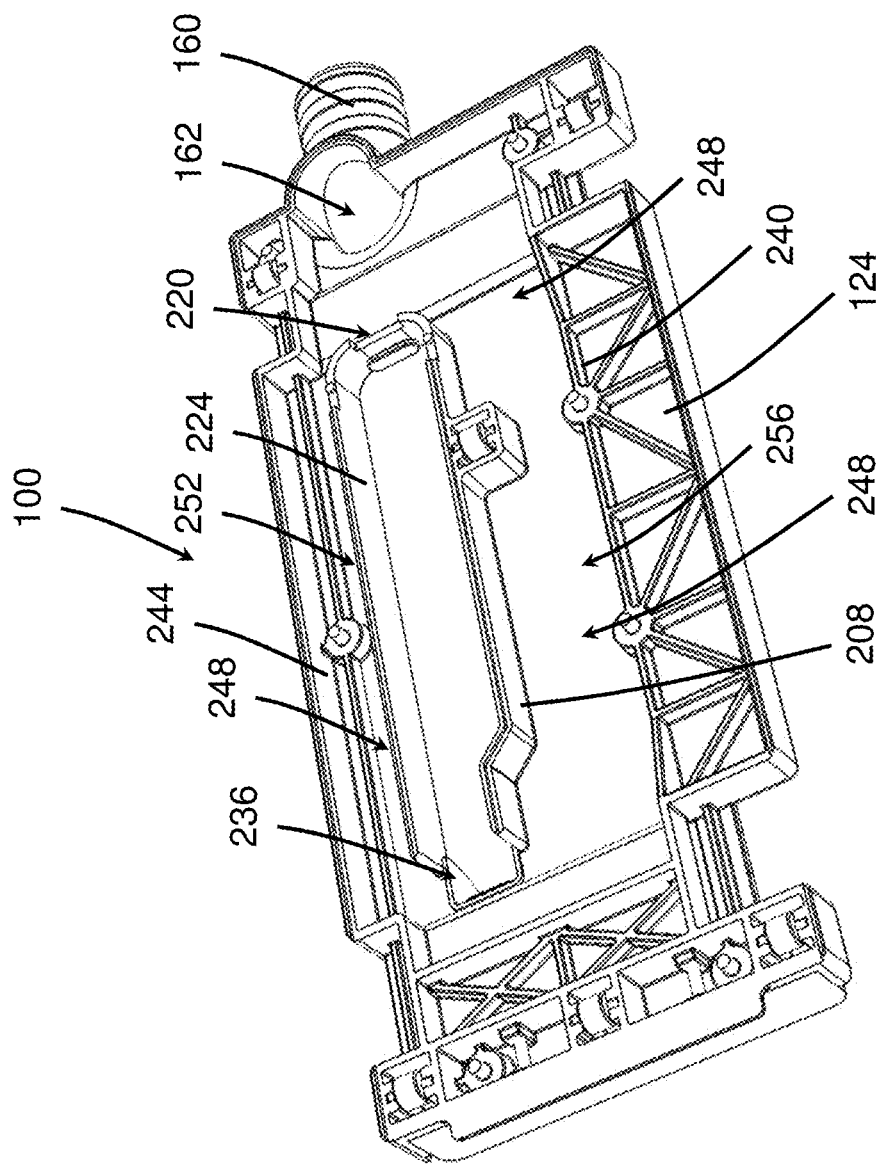
FIG. 14 is a drawing which shows a perspective view of the shroud.
Figure 15:
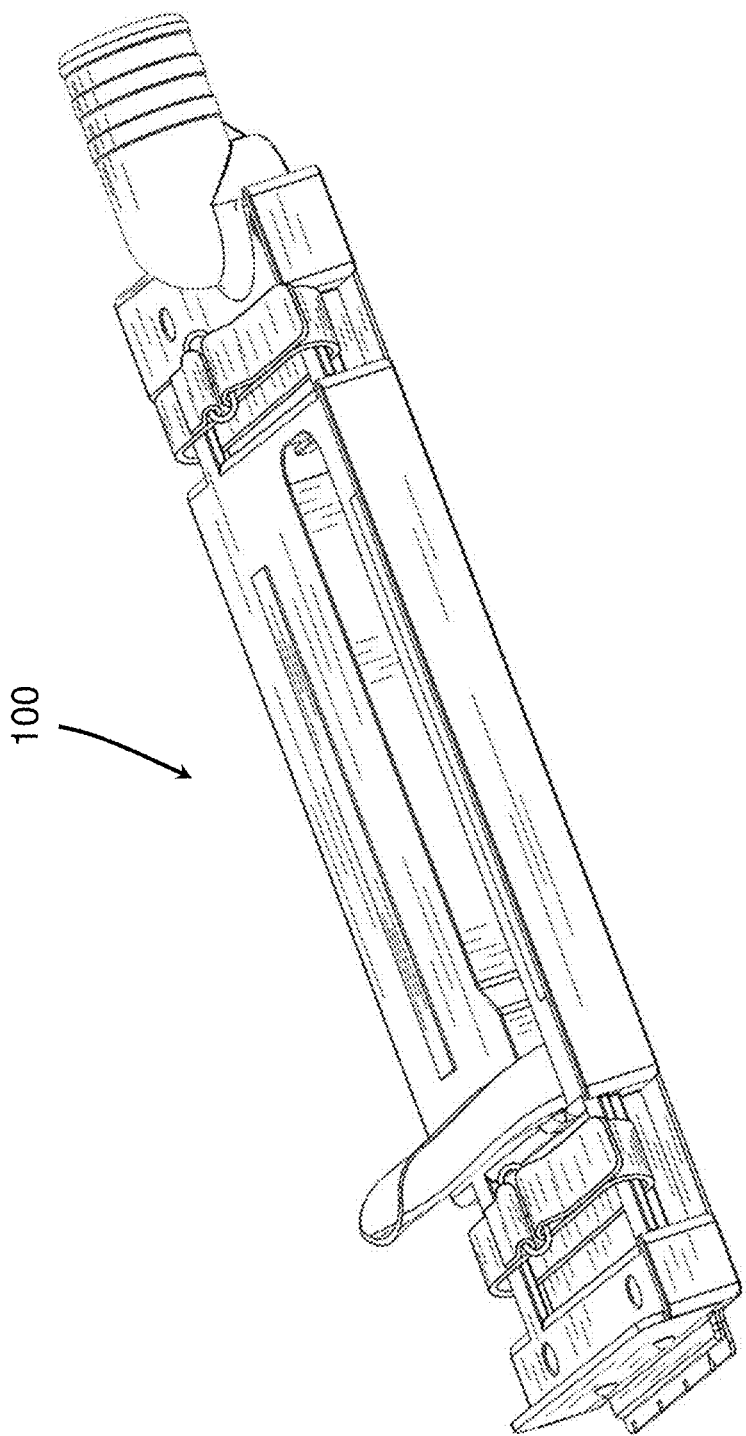
FIG. 15 is a drawing which shows a perspective view of the shroud.
Figure 16:
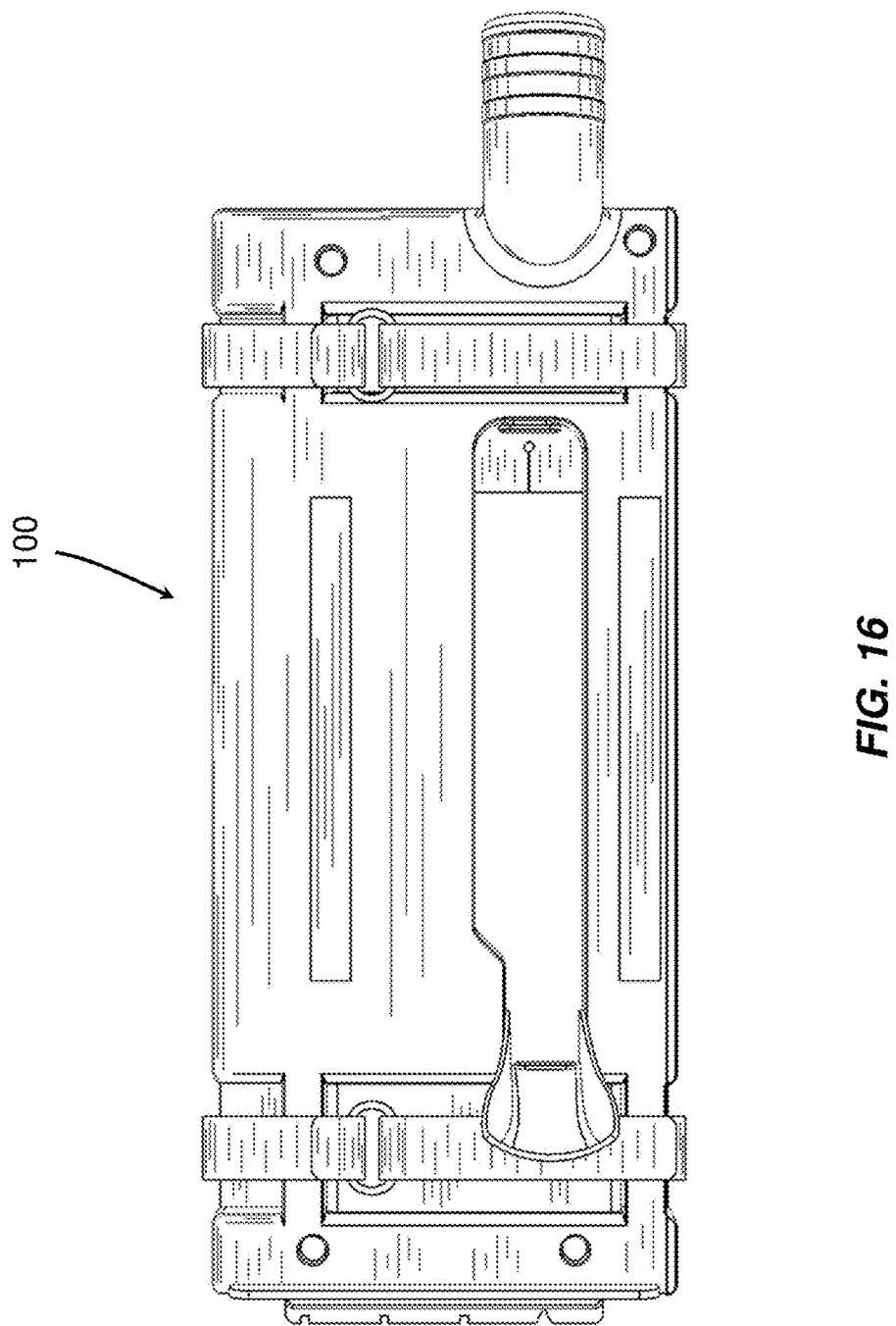
FIG. 16 is a drawing which shows a top view of the shroud.
Figure 17:
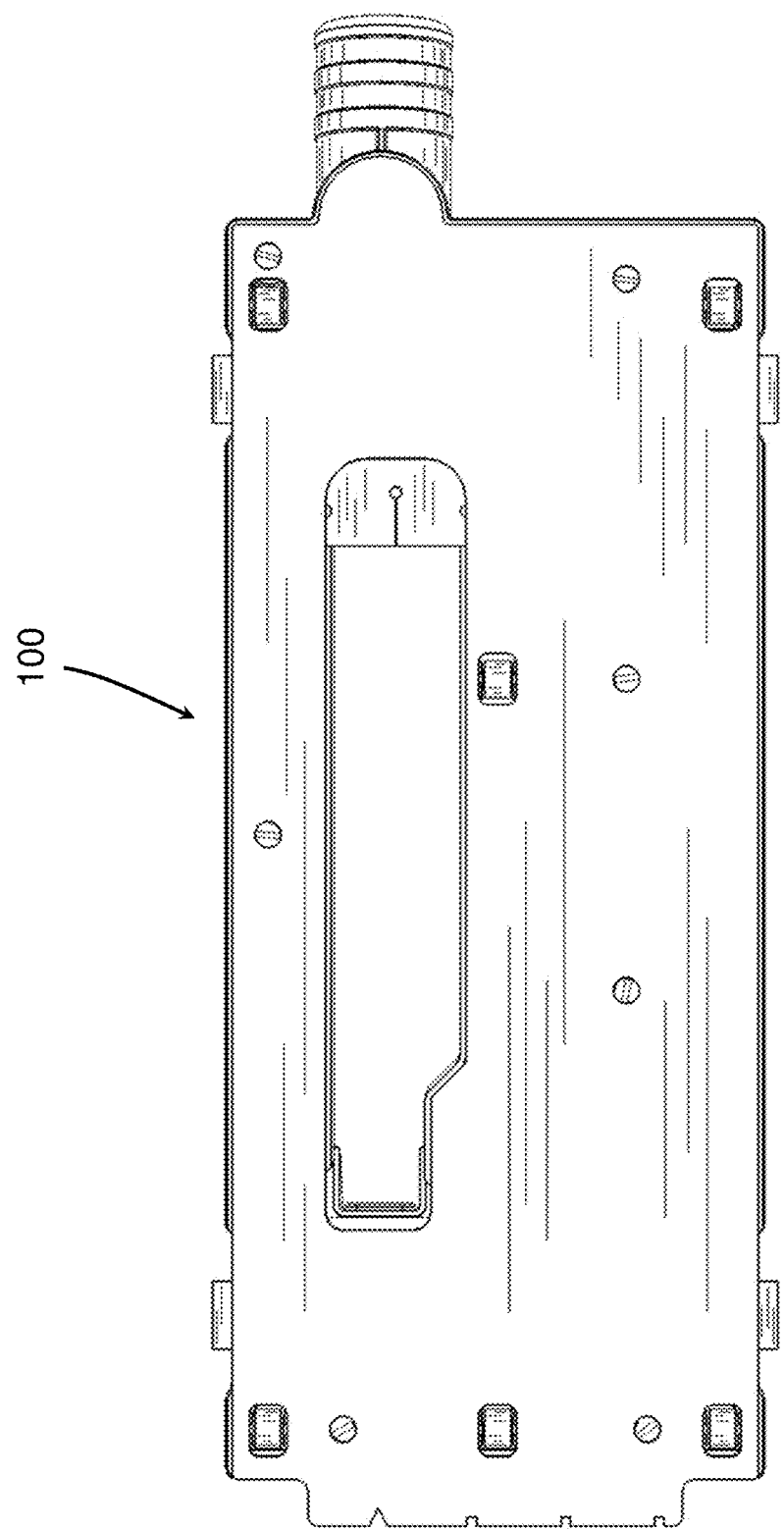
FIG. 17 is a drawing which shows a bottom view of the shroud.
Figure 18:
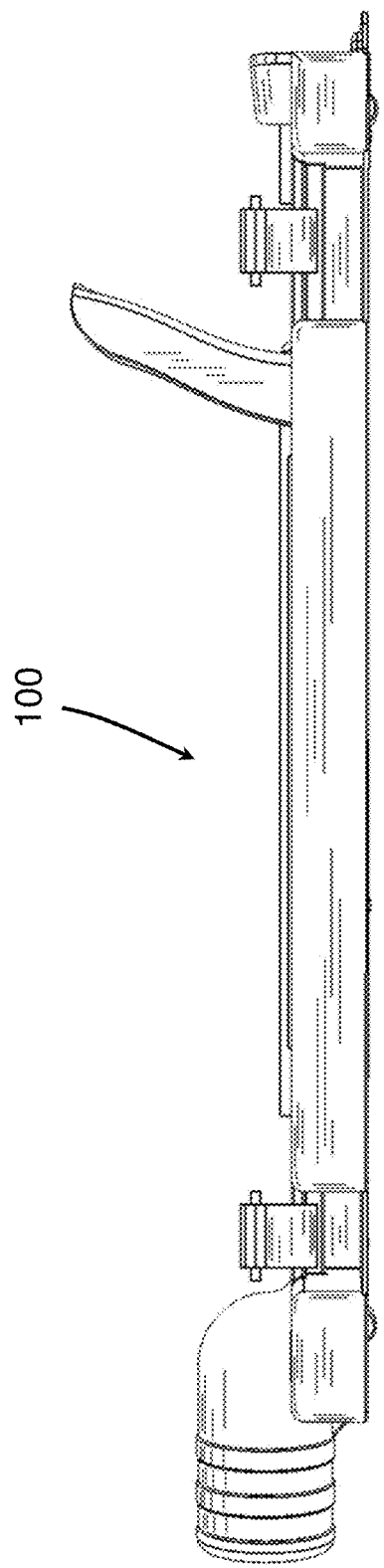
FIG. 18 is a drawing which shows a left view of the shroud.
Figure 19:
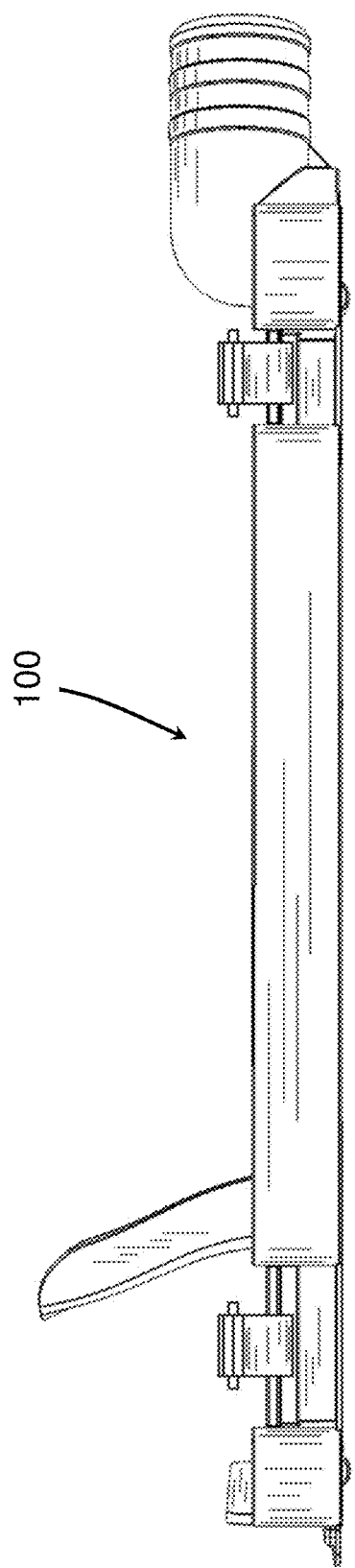
FIG. 19 is a drawing which shows a right view of the shroud.
Figure 20:
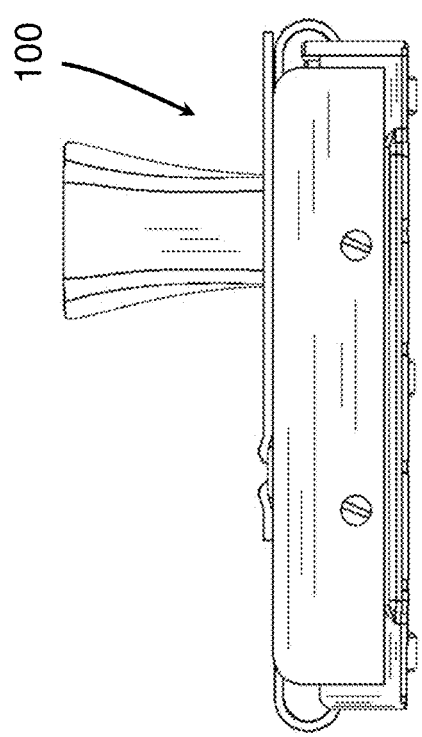
FIG. 20 is a drawing which shows a front view of the shroud.
Figure 21:
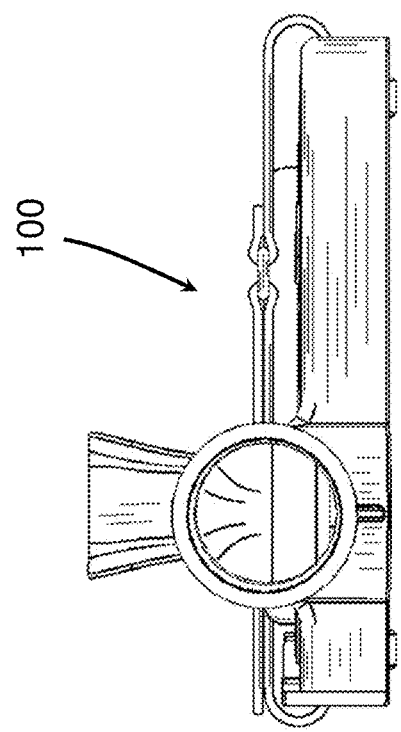
FIG. 21 is a drawing which shows a back view of the shroud.

FIGS. 13 and 14 show bottom and perspective views of the shroud 100 with the lower plate 128 removed. It can be seen how the upper plate 124 is formed with internal walls and bosses that facilitate mounting of the other shroud pieces. Additionally, internal walls 240 and external walls 244 form a plenum 248 within the upper plate 124. The plenum 248 extends from the exhaust port 160 forwards around the blade opening 148 and to a position adjacent the front of the shroud 100. The bore 162 of the exhaust port 160 is connected to the plenum 248 so that air flows from the plenum, through the exhaust port, and to a vacuum, etc. It can be seen how the exhaust port bore 162 is generally horizontal near the exhaust port exit and curves down and merges into the plenum 248.

A left side air flow passage 252 is formed between the closed left side wall 224 and an exterior wall 244 of the upper plate 124. The left side air flow passage 252 extends along the left side of the blade opening 148. A right side air flow passage 256 is formed between the closed right side wall 208 of the blade opening 148 and interior walls 240 of the upper plate 124 (or between the closed right side wall 208 and a right side exterior wall of the upper plate). The right side air flow passage extends along the right side of the blade opening 148. During operation, air and debris is drawn into the front dust collection opening 236, along the left side air flow passage 252 and the right side air flow passage 256, through the bore 162 of the exhaust port 160, and into a vacuum hose 164 and into a vacuum or other dust collection system. Air and debris is also drawn into the rear dust collection port 220, through the bore 162 of the exhaust port 160, and into a vacuum hose 164 and into a vacuum or other dust collection system.

The closed right side wall 208 and the closed left side wall 224 thus block off the plenum 248 from the sides of the circular saw blade 18. The left side air flow passage 252 and the right side air flow passage 256 and the front dust collection opening 236 and rear dust collection opening 220 capture dust and debris from the front and back of the blade 18. Dust and debris which is captured from the front of the blade enters the front dust collection opening 236 and passes through the sir flow passages 252, 256 parallel to the blade 18 to the rear of the plenum 248 and through the exhaust port 160. Dust and debris captured from the rear of the blade 18 enters the rear dust collection opening 220 and passes rearwardly through the plenum and through the exhaust port.

FIGS. 15 through 21 show perspective, top, bottom, left, right, front, and back views of the shroud, respectively, and provide further illustration of the shroud.

The shroud 100 improves dust collection from a circular saw. The dust collection openings 220, 236, air flow passages 252, 256, and plenum 248 effectively capture most of the dust and debris generated while using the circular saw 10. The shroud 100 is adaptable to different circular saws as well as to different blade usage and materials; providing a near universal shroud for circular saws. The wheels 204 assist in straight cutting and reduce the cutting effort; maintaining stability of the saw 10 during and after cutting.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims. Indeed, it is appreciated that specific example dimensions, materials, voltages, currents, frequencies, power range values, times, etc., are provided for explanation purposes and that other values may also be employed in other examples in accordance with the teachings of the present invention.

What is claimed is:

1. A shroud for a circular saw comprising:
   an upper plate having an upper surface which is attachable to a lower surface of a circular saw shoe;
   a lower plate attached to a bottom of the upper plate, the lower plate having a lower surface which is placed adjacent a surface of a material for cutting the material;
   an air flow plenum located between the upper plate and the lower plate;
   a blade opening in the shroud, the blade opening extending through the upper plate and the lower plate to allow a circular saw blade to pass through the blade opening and cut a material, wherein the blade opening comprises a left side, a right side, a rear end, a front end, a width between the left side and the right side, and a length between the front end and the rear end which is longer than the width;
   a closed left side wall extending along a majority of the left side of the blade opening which blocks air flow into the plenum through the left side of the blade opening and a closed right side wall extending along a majority of the right side of the blade opening which blocks air flow into the plenum through the right side of the blade opening
   an exhaust port attached to the shroud, the exhaust port having a bore which is open to the plenum;
   a front dust collection opening which is located between the left side of the blade opening and the right side of the blade opening and which creates an air flow passage through the front end of the blade opening between the upper plate and the lower plate, wherein the front dust collection opening is connected to the plenum such that air is drawn from the front end of the blade opening, through the airflow passage in the front end of the blade opening, into the plenum, and out the exhaust port by a vacuum source.

2. The shroud of claim 1, further comprising a rear dust collection opening which is located between the left side of the blade opening and the right side of the blade opening and which creates a rear air flow passage through the rear end of the blade opening between the upper plate and the lower plate, and wherein the rear dust collection opening is connected to the plenum such that air is drawn through the rear dust collection opening, into the plenum, and out the exhaust port.

3. The shroud of claim 2, wherein the front dust collection opening is larger than the rear dust collection opening.

4. The shroud of claim 2, wherein the front dust collection opening is between about 4 times and about 8 times as large as the rear dust collection opening.

5. The shroud of claim 2, wherein the shroud comprises an air flow passage which extends from the rear dust collection opening forwards to the front dust collection opening and which connects the rear dust collection opening and the front dust collection opening into a common plenum.

6. The shroud of claim 2, further comprising a flexible elastomeric wiper disposed at the rear end of the blade opening adjacent the lower surface of the lower plate, wherein the wiper is disposed generally coplanar to the lower plate and wherein the wiper extends across the blade opening between the left side of the blade opening and the right side of the blade opening and extends forwards from the rear end of the blade opening a distance.

7. The shroud of claim 1, further comprising a rear hood which is attached to the shroud at the rear end of the blade opening, the rear hood comprising a lower portion which extends along the rear end of the blade opening, and wherein the rear hood comprises a tongue shaped extension which extends upwardly behind the blade opening from the rear hood lower portion to a position over the rear end of the blade opening and above the shroud to channel air and debris into the dust collection opening.

8. A system comprising the shroud of claim 7, further comprising a saw having a base plate which is attached to the shroud upper plate, a saw blade which extends through the blade opening, and a blade guard which extends around a top of the saw blade, and wherein the rear hood extends upwardly to a back portion of the blade guard.

9. The shroud of claim 1, further comprising a front hood which is attached to the shroud at the front end of the blade opening, wherein the front hood has a lower portion which extends along the front end of the blade opening and wherein the front hood comprises a tongue shaped extension which extends upwardly in front of the blade opening from front hood lower portion to a position over the front end of the blade opening to channel air and debris into the dust collection opening.

10. The shroud of claim 9, wherein the lower portion of the front hood extends along a front portion of the left side of the blade opening, along the front end of the blade opening, and along a front portion of the right side of the blade opening.

11. A system comprising the shroud of claim 9, further comprising a saw having a base plate which is attached to the shroud upper plate, a saw blade which extends through the blade opening, and a blade guard which extends around a top of the saw blade, and wherein the front hood extends upwardly to a front portion of the blade guard.

12. A shroud for a circular saw comprising:
an upper plate having an upper surface which is attachable to a lower surface of a circular saw shoe;
a lower plate attached to a bottom of the upper plate, the lower plate having a lower surface which is placed adjacent a surface of a material for cutting the material;
an air flow plenum located between the upper plate and the lower plate;
a blade opening in the shroud, the blade opening extending through the upper plate and the lower plate to allow a circular saw blade to pass through the blade opening and cut a material, wherein the blade opening comprises a left side, a right side, a rear end, a front end, a width between the left side and the right side, and a length between the front end and the back end which is longer than the width;
an exhaust port attached to the shroud, the exhaust port having a bore which is open to the plenum;
a dust collection opening located in the blade opening, the dust collection opening being connected to the plenum such that air is drawn through the dust collection opening, into the plenum, and out the exhaust port by a vacuum source; and
a front hood attached to the shroud at the front end of the blade opening, wherein the front hood has a lower portion which extends along the front end of the blade opening and wherein the front hood comprises a flexible tongue shaped extension which extends upwardly in front of the blade opening from the front hood lower portion to a position over the front end of the blade opening and above the shroud and adjacent an upper stationary blade guard of a circular saw which is attached to the shroud to funnel air and debris into the dust collection opening.

13. The shroud of claim 12, wherein the lower portion of the front hood extends along a front portion of the left side of the blade opening, along the front end of the blade opening, and along a front portion of the right side of the blade opening.

14. The shroud of claim 12, wherein the dust collection opening is a front dust collection opening which is located at the front end of the blade opening and which forms an airflow passage at the front end of the blade opening between the upper plate and the lower plate.

15. The shroud of claim 14, further comprising a rear dust collection opening which is located at the rear end of the blade opening and which forms an airflow passage at the rear end of the blade opening which is connected to the plenum such that air is drawn through the rear dust collection opening, into the plenum, and out the exhaust port.

16. The shroud of claim 12, further comprising a rear hood which is attached to the shroud at a rear of the blade opening, the rear hood comprising a lower portion which extends along the rear end of the blade opening, and wherein the rear hood comprises a tongue shaped extension which extends upwardly behind the blade opening from the rear hood lower portion to a position above the blade opening and above the shroud.

17. A system comprising the shroud of claim 16, further comprising a saw having a base plate which is attached to the shroud upper plate, a saw blade which extends through the blade opening, and a blade guard which extends around a top of the saw blade, and wherein the rear hood extends upwardly to a rear portion of the blade guard.

18. A system comprising the shroud of claim 12, further comprising a saw having a base plate which is attached to the shroud upper plate, a saw blade which extends through the blade opening, and a blade guard which extends around a top of the saw blade, and wherein the front hood extends upwardly to a front portion of the blade guard.

19. The system of claim 18, wherein a top of the front hood is positioned between the blade guard and the saw blade.

20. The shroud of claim 12, wherein the blade opening is defined by a closed left side wall extending along a majority of the left side of the blade opening which blocks air flow into the plenum through the left side of the blade opening and a closed right side wall extending along a majority of the right side of the blade opening which blocks air flow into the plenum through the right side of the blade opening.

* * * * *